(12) United States Patent
Takashima

(10) Patent No.: US 7,969,594 B2
(45) Date of Patent: Jun. 28, 2011

(54) INFORMATION PROCESSING APPARATUS, INFORMATION PROCESSING SYSTEM, AND PROXY METHOD FOR CONNECTION OF INFORMATION PROCESSING APPARATUSES

(75) Inventor: Keiichi Takashima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1124 days.

(21) Appl. No.: 11/693,868

(22) Filed: Mar. 30, 2007

(65) Prior Publication Data

US 2007/0229876 A1 Oct. 4, 2007

(30) Foreign Application Priority Data

Mar. 30, 2006 (JP) ................................ 2006-095843

(51) Int. Cl.
*G06K 15/00* (2006.01)
*G06F 21/00* (2006.01)
(52) U.S. Cl. ........... 358/1.14; 358/1.15; 726/27; 705/59
(58) Field of Classification Search ................. 358/1.13, 358/1.14, 1.15, 1.16; 705/51–59; 718/105; 717/169, 120, 175; 726/27
See application file for complete search history.

(56) References Cited

U.S. PATENT DOCUMENTS

| 7,206,765 | B2 * | 4/2007 | Gilliam et al. ................. 705/51 |
| 7,477,745 | B2 | 1/2009 | Nakamura et al. ............. 380/243 |
| 7,647,647 | B2 * | 1/2010 | Schultz ......................... 726/29 |
| 7,689,512 | B2 * | 3/2010 | Hase et al. .................... 705/59 |
| 2004/0001215 | A1 * | 1/2004 | Kurotsu ........................ 358/1.13 |
| 2004/0010440 | A1 * | 1/2004 | Lenard et al. .................. 705/10 |
| 2004/0117784 | A1 | 6/2004 | Endoh .......................... 717/169 |
| 2006/0021012 | A1 | 1/2006 | Ito ............................... 726/5 |
| 2007/0006324 | A1 * | 1/2007 | Osada et al. ................... 726/27 |
| 2007/0268509 | A1 * | 11/2007 | Andreoli et al. ............... 358/1.14 |

FOREIGN PATENT DOCUMENTS

| JP | 2000-035867 | 2/2000 |
| JP | 2000-047772 | 2/2000 |
| JP | 2001-290788 | 10/2001 |
| JP | 2003-076521 | 3/2003 |
| JP | 2003-122537 | 4/2003 |

(Continued)

OTHER PUBLICATIONS

Japanese Office Action Dated Mar. 23, 2009.
Notification of Reasons for Refusal, Japanese Pat. Appln. No. 2006-095843, dated Mar. 23, 2010.

(Continued)

*Primary Examiner* — Twyler L Haskins
*Assistant Examiner* — Dennis Dicker
(74) *Attorney, Agent, or Firm* — Fitzpatrick, Cella, Harper & Scinto

(57) ABSTRACT

An object of this invention is to implement a user-friendly proxy process in a network system in which a plurality of devices connect to each other. According to this invention, an information processing method for an information processing apparatus which manages a license for a job process and communicably connects to a plurality of devices that are to execute a process for a job whose license is held includes a step of selecting, from the plurality of devices, a device which is to execute a proxy process of a job, a step of, when the selected device does not have a license to execute the process of the job, outputting the license as a file, and a step of monitoring whether the selected device has executed the proxy process of the job using the file, and when the proxy process is complete, requesting return of the output file.

14 Claims, 31 Drawing Sheets

FOREIGN PATENT DOCUMENTS

| | | |
|---|---|---|
| JP | 2004-139148 | 5/2004 |
| JP | 2004-246592 | 9/2004 |
| JP | 2006-039669 | 2/2006 |
| JP | 2006-040262 | 2/2006 |

OTHER PUBLICATIONS

English Translation of "Notification of Reasons for Refusal", dated Mar. 23, 2010, Japanese Pat. Appln. No. 2006-095843.

* cited by examiner

FIG. 21

| MANAGEMENT ID | LICENSE IDENTIFIER | STATUS | TYPE | UPPER LIMIT VALUE | RENTAL DESTINATION DEVICE |
|---|---|---|---|---|---|
| 00001 | ID_00ab506 | VALID & OWNED | COUNT | 5000 | (BLANK) |
| 00002 | ID_0023a47 | INVALID & DURING RENTAL | EXPIRATION DATE | 2005/12/31 | DEVICE B |
| 00003 | ID_10gfeg8 | VALID & DURING RENTAL | COUNT | 20 | DEVICE B |
| ... | | | | | |

```
                                                    2700
    ┌─────────────────────────────────────────────────┐
    │  SEARCH ID :                                    │
    │                                                 │
    │  RESPONSE DEVICE : [DEVICE NAME + NETWORK ADDRESS] │
    │                                                 │
2701│──LICENSE RENTAL : [NECESSARY / UNNECESSARY]     │
    │                                                 │
2702│──COMPONENT TRANSMISSION : [NECESSARY / UNNECESSARY] │
    │                                                 │
2703│──TICKET EXPIRATION DATE :                       │
    └─────────────────────────────────────────────────┘
```

ASKING ID :

ASKING DEVICE : [DEVICE NAME + NETWORK ADDRESS]

2801 — NECESSARY LICENSE :

2802 — NECESSARY COMPONENT :

2803 — NECESSARY CAPABILITY :

2804 — INPUT INFORMATION : [INPUT DATA OR STORAGE LOCATION]

2805 — OUTPUT INFORMATION : [RETURN METHOD OR STORAGE LOCATION]
```

FIG. 29

```
SEARCH ID :
SEARCH SOURCE DEVICE : [DEVICE NAME + NETWORK ADDRESS]
NECESSARY LICENSE : [NONE / LICENSE ID]
NECESSARY COMPONENT :
NECESSARY CAPABILITY :
LICENSE RENTAL PERMISSION / INHIBITION : [PERMITTED / INHIBITED]
COMPONENT TRANSMISSION PERMISSION / INHIBITION : [PERMITTED / INHIBITED]
LICENSE RETURN TIMING : [NONE / IMMEDIATELY / AFTER REQUEST]
TICKET EXPIRATION DATE :
```

| MANAGEMENT ID | LICENSE IDENTIFIER | STATUS | TYPE | UPPER LIMIT VALUE | RETURN | RENTAL DESTINATION DEVICE |
|---|---|---|---|---|---|---|
| 00001 | ID_00ab506 | VALID & OWNED | COUNT | 5000 | (BLANK) | (BLANK) |
| 00002 | ID_0023a47 | INVALID & DURING RENTAL | EXPIRATION DATE | 2005/12/31 | IMMEDIATELY | DEVICE B |
| 00003 | ID_10gfeg8 | VALID & DURING RENTAL | COUNT | 20 | AFTER REQUEST | DEVICE B |
| ... | | | | | | |

3001

INFORMATION PROCESSING APPARATUS, INFORMATION PROCESSING SYSTEM, AND PROXY METHOD FOR CONNECTION OF INFORMATION PROCESSING APPARATUSES

BACKGROUND OF THE INVENTION

1. Field of the Invention

The present invention relates to a proxy process technique of implementing a proxy process in a network system in which a plurality of information processing apparatuses communicably connect to each other.

2. Description of the Related Art

These days, a network system in which computers and peripheral devices connect to each other via a network has prevailed with the development of the network technique.

As a peripheral device, a multifunction type peripheral device called an MFP (Multi Function Peripheral) becomes popular. A recent MFP incorporates advanced application software (to be referred to as a device application hereinafter).

In this situation, the MFP is used not only as a data input/output device for a computer, but also as a server device which provides various services. At present, this allows the advent of a network system built from only MFPs.

The network system built from only MFPs suffers the following problem when applied to an environment such as the office. When the user inputs a job from a predetermined MFP using a device application, but the MFP has a heavy load or does not have capability necessary to execute the device application, the job ends without any process.

In a conventional network system, the user deals with this case by waiting for his turn of the job process or going to another MFP to start the operation again. Recently, however, there is proposed a proxy process technique of causing another MFP to execute a job using a network (see, e.g., Japanese Patent Laid-Open Nos. 2000-35867 and 2000-47772). This technique contributes to user friendliness.

However, the conventionally proposed proxy process technique requires registration of an alternative device in an original device in advance, and fixes an alternative device. When the system configuration changes upon addition/deletion of a device, change of an existing device into an optional device, or the like, the alternative device registration setting of all devices which register alternative devices must be changed.

The same device application as that of an original device must be installed in an alternative device with a license (authority to execute a job process). As described above, the conventional proxy process technique requires change of settings every time the system configuration changes, also requires various settings made for each device in advance, and are not user-friendly.

SUMMARY OF THE INVENTION

The present invention has been made to overcome the conventional drawbacks. The present invention provides information processing apparatus for implementing a user-friendly proxy process in a network system in which a plurality of devices connect to each other.

The information processing apparatus according to the present invention comprises the following arrangement. That is, an information processing apparatus which communicates with an external information processing apparatus that executes a process of a job within a range of authority data, comprising:

a receiving unit configured to receive a job;

a determination unit configured to determine whether the information processing apparatus cannot execute a process of the job received by the receiving unit; and an output unit configured to, when the determination unit determines that the information processing apparatus cannot execute the process of the job received by the receiving unit, output the job and authority data of the received job to the external information processing apparatus.

The present invention can implement a user-friendly proxy process in a network system in which a plurality of devices connect to each other.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 21 is a table showing an example of the structure of a license DB;

FIG. 27 is a view showing an example of a proxy search response ticket;

FIG. 28 is a view showing an example of a proxy asking ticket;

FIG. 29 is a view showing an example of a proxy search ticket capable of designating the license return timing;

FIG. 30 is a table showing an example of a license DB corresponding to the proxy search ticket capable of designating the license return timing.

DESCRIPTION OF THE EMBODIMENTS

Preferred embodiments of the present invention will now be described in detail in accordance with the accompanying drawings.

First Embodiment

1. Hardware Configuration of Information Processing Apparatus 1.1 Overall Configuration FIG. 1 is a block diagram showing the hardware configuration of an information processing apparatus 100 according to the first embodiment of the present invention.

Figure 1:
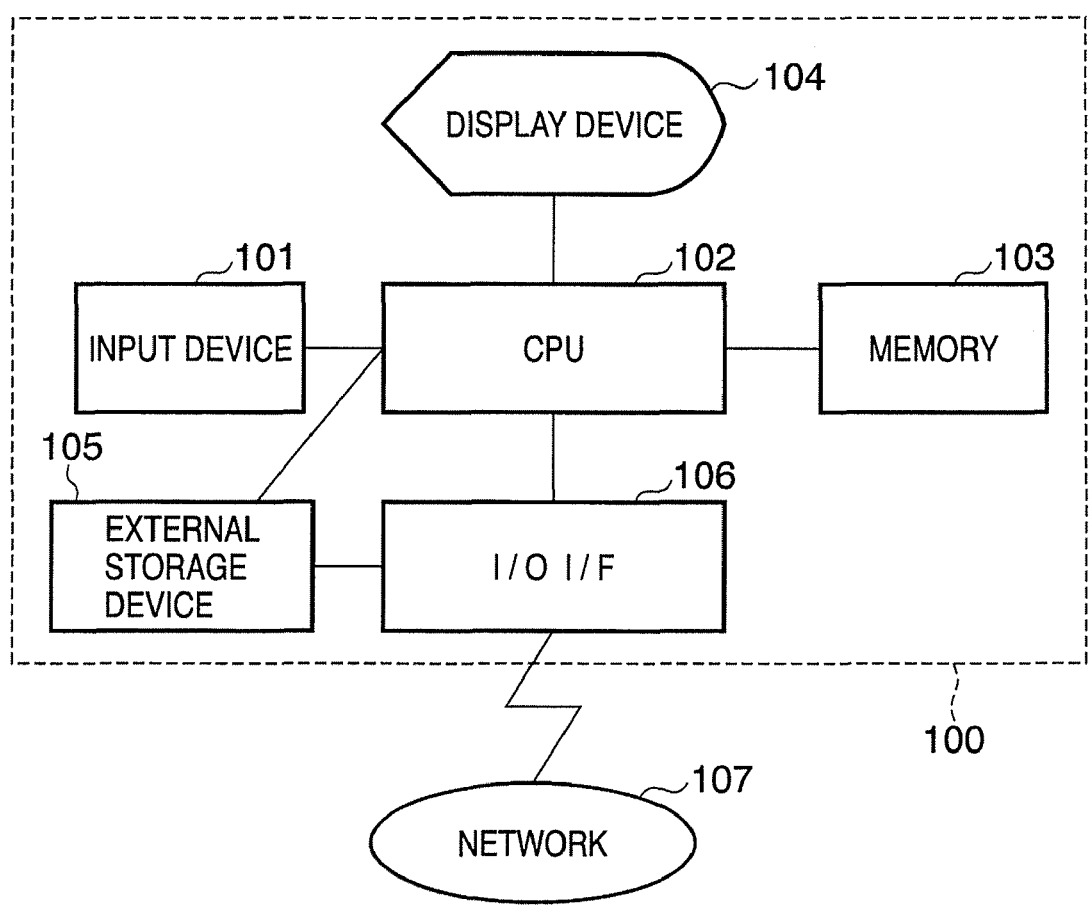
FIG. 1 is a block diagram showing the hardware configuration of an information processing apparatus 100 according to the first embodiment of the present invention.

As shown in FIG. 1, the information processing apparatus 100 comprises a central processing unit (CPU) 102, a main storage device (memory) 103 including a RAM and ROM, and an external storage device 105 including an FD drive and HD drive. The information processing apparatus 100 also comprises an input device 101 including a touch panel and keys, a display device 104 such as a CRT display or a liquid crystal panel integrated with a touch panel, and an external input/output interface (I/O I/F) 106 which connects to an external network 107.

The information processing apparatus 100 runs when the CPU 102 executes a basic I/O program, OS, and various control programs.

The basic I/O program is written in the memory 103, and the OS is written in the HD drive 105. When the information processing apparatus 100 is turned on, the IPL (Initial Program Loading) function in the basic I/O program loads the OS from the HD drive 105 into the RAM 103, and the OS operation starts.

Figure 2:
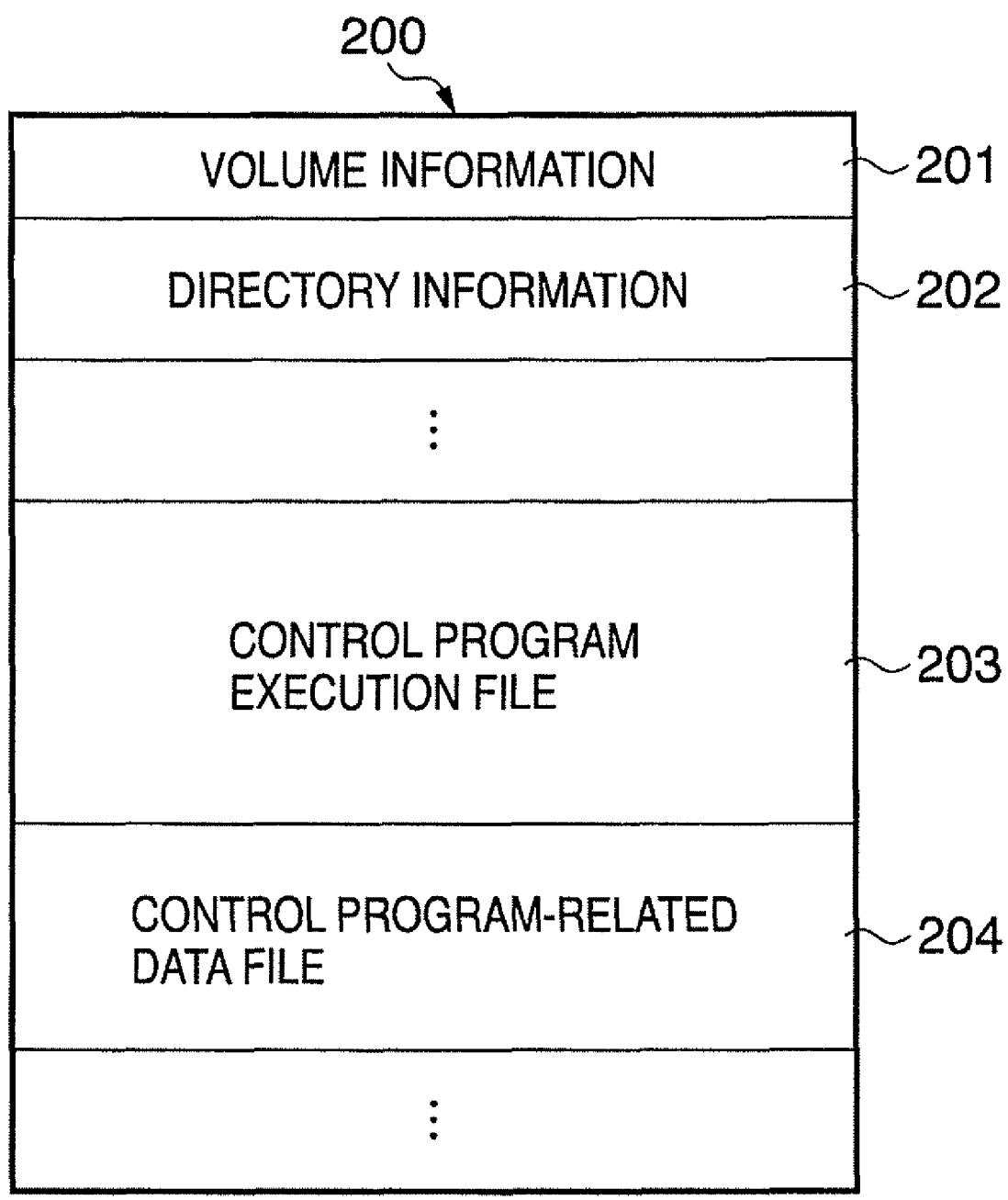
FIG. 2 is a view showing contents recorded on an FD inserted into the information processing apparatus 100 and the structure of the contents.

The control program is formed into program codes on the basis of the flowcharts of control sequences shown in the accompanying drawings to be described later. In the embodiment, the FD records the control program and related data. FIG. 2 shows contents recorded on the FD and their structure.

1.2 Structure in FD

FIG. 2 is a view showing contents recorded on the FD and their structure. As shown in FIG. 2, an FD 200 has a volume information recording area 201, directory information recording area 202, control program execution file recording area 203, and control program-related data file recording area 204.

A control program and related data recorded on the FD are loaded into the RAM 103 via the FD drive 105 serving as an external storage device, as shown in FIG. 1. More specifically, when the FD is set in the FD drive 105, the control program and related data are read out from the FD 200 under the control of the OS and basic I/O program, and loaded into the RAM 103.

1.3 Memory Map of RAM

Figure 3:
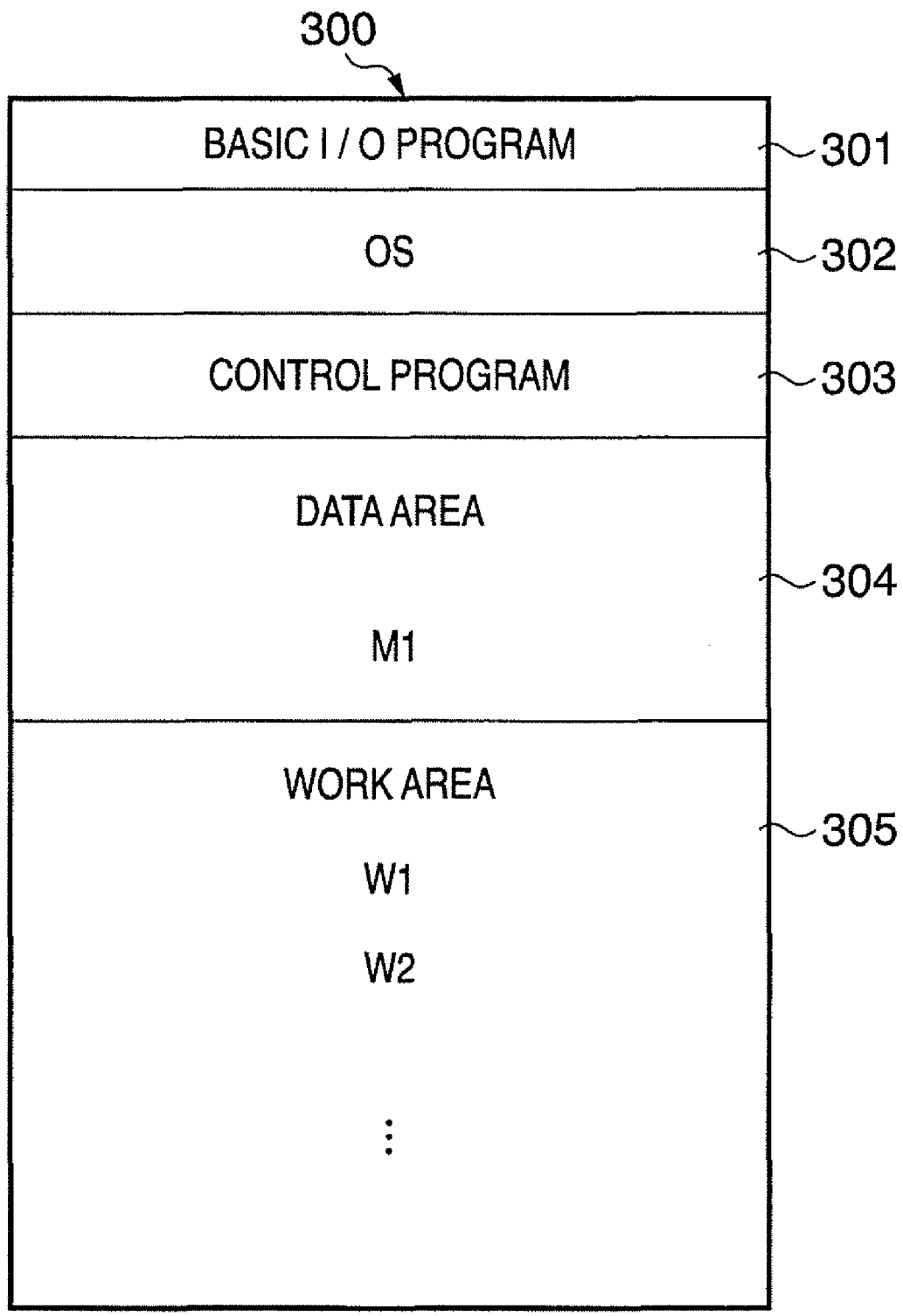
FIG. 3 is a view showing a memory map in a state in which a control program is loaded into a RAM 103 and becomes executable.

FIG. 3 shows a memory map in a state in which the control program is loaded into the RAM 103 and becomes executable.

The basic I/O program is expanded in an area 301, the OS is expanded in an area 302, and the control program is expanded in an area 303. Related data is loaded into a data area 304. An area 305 is used as the work area of the CPU 102.

In the embodiment, the control program and related data are directly loaded from the FD 200 into the RAM 103 and executed. However, the present invention is not particularly limited to this. For example, the control program and related data may be stored in the HD drive 105 and loaded from it. The medium which records the control program may be an optical disk, IC memory card, or the like. It is also possible to record the control program in the ROM 103 and directly execute it by the CPU 102.

2. Configuration of Network System which Implements Proxy process

Figure 4:
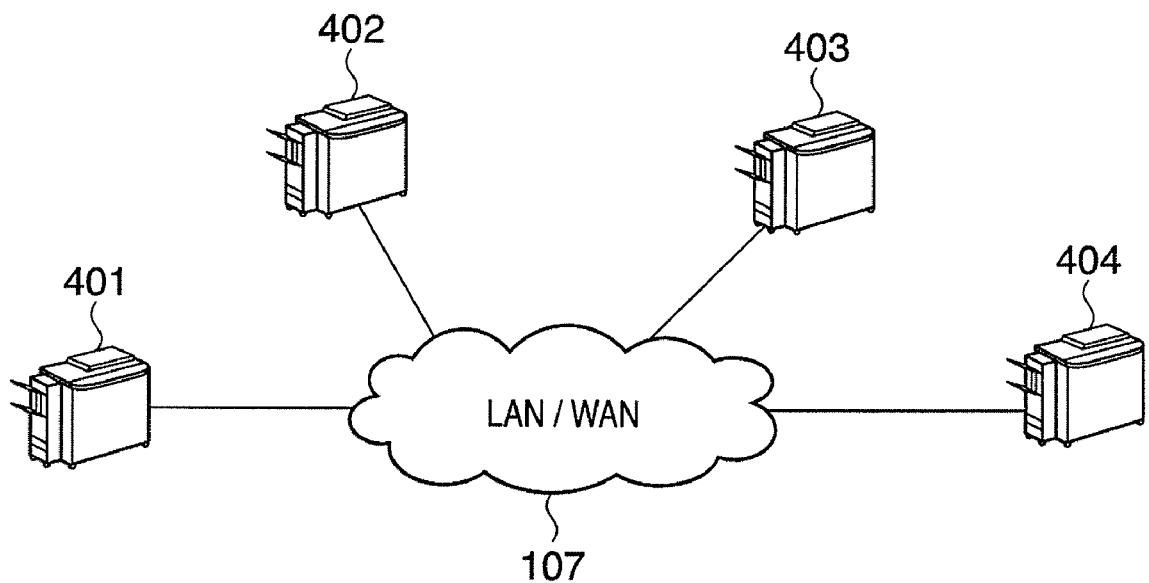
FIG. 4 is a view showing an example of the configuration of a network system in which a plurality of MFPs each having the information processing apparatus 100 connect to each other via a network such as a LAN or WAN.

FIG. 4 is a view showing an example of the configuration of a network system in which a plurality of MFPs each having the information processing apparatus 100 connect to each other via the network 107 such as a LAN or WAN.

Reference numerals 401 to 404 denote MFPs (Multi Function Peripherals) each having the information processing apparatus 100. However, apparatuses which build the network system are not limited to MFPs, and may be facsimile apparatuses, printers, or copying machines as long as they have the information processing apparatus 100.

In the following description, an information processing apparatus mounted in the MFP 401 among information processing apparatuses mounted in the respective MFPs functions as a license providing device to be described later. Information processing apparatuses mounted in the MFPs 402 to 404 function as application operating devices to be described later.

The information processing apparatus functioning as the license providing device will be called "device A", and any of the information processing apparatuses functioning as the application operating devices will be called "device B".

Figure 5:
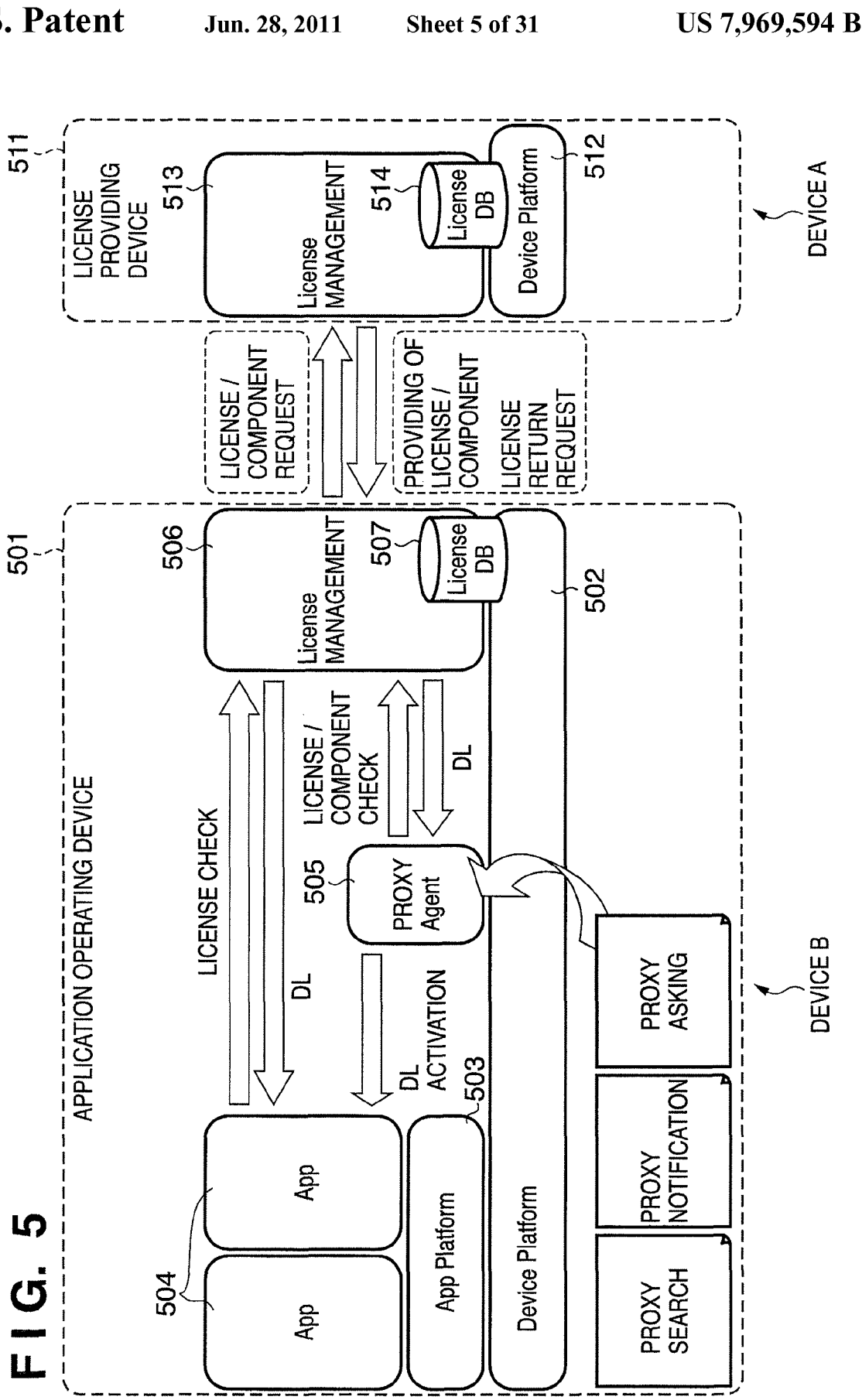
FIG. 5 is a view showing the module configurations of information processing apparatuses in the network system shown in FIG. 4.

3. Module Configurations of Information Processing Apparatuses in Network System FIG. 5 is a view showing the module configurations of information processing apparatuses in the network system shown in FIG. 4. Reference numeral 501 denotes a module configuration for the information processing apparatus (device B) functioning as the application operating device. Reference numeral 511 denotes a module configuration for the information processing apparatus (device A) functioning as the license providing device.

3.1 Module Configurations of Device A

As shown in FIG. 5, the information processing apparatus (device A) functioning as the license providing device 511 comprises a device platform 512. The device platform 512 executes the basic I/O program, OS, device driver, network I/F, and the like, implementing various functions.

A license management unit 513 is one module of an application platform that manages the license of device A and a component serving as an example of the control program. The license management unit 513 implements a function of providing and returning a license and component in synchronism with a license management unit 506 of an external device (device B).

A license database 514 stores licenses. FIG. 21 shows an example of the structure of the license database 514.

As shown in FIG. 21, the license database 514 has a management ID storage column 2101, license identifier storage column 2102, status storage column 2103, type storage column 2104, upper limit value storage column 2105, and rental destination device storage column 2106. The "management ID" is an identifier added to manage each license stored in the license database 514. The "license identifier" is an identifier uniquely added to each license.

The "status" includes "valid/invalid" and "during rental/owned", which are combined into four license statuses. When the license has expired or the valid count is 0, the license is "invalid". When some or all of valid licenses owned are output as a file to another device, these licenses are "during rental". In this case, the rental destination device storage column 2106 stores a device name at the rental destination.

The "type" represents the type of license. For example, when the license authorizes the upper limit of something countable such as a device application execution count or print count, the type=count. The upper limit value storage column 2105 stores this upper limit value.

When the type=count, another license can be generated as a file within the range of the upper limit value. The original license and the newly generated license are both valid within the range of the upper limit value. In this case, the status storage column of the license database 514 holds "valid & during rental" for the original license. To the contrary, a license DB 507 (to be described later) holds "valid & owned" for the newly generated license.

All licenses within the upper limit value may also be output as a license file. In this case, the original license changes to "invalid & during rental", and the output license changes to "valid & owned" in the license database 507.

If the license is prepared by authorizing the upper limit of something uncountable such as the type=expiration date, no part of the license can be provided as another license. In rental, the entire license is output as a license file serving as an example of authority data.

3.2 Module Configurations of Device B

The information processing apparatus (device B) functioning as the application operating device 501 comprises a device platform 502. The device platform 502 executes the basic I/O program, OS, device driver, network I/F, and the like, implementing various functions.

An application platform 503 provides the operating environment of a device application 504, and runs on the device platform 502. A proxy agent 505 is one module of the application platform that receives various messages about a proxy process from an external device (device A) and performs a corresponding process. The proxy agent 505 mediates the information processing apparatus (device A) functioning as the external license providing device 511.

The license management unit 506 is one module of the application platform that manages the license and component of device B. The license management unit 506 implements a function of providing and returning a license and component in synchronism with the license management unit 513 of an external device (device A).

The license database 507 stores licenses. The database structure is the same as that in FIG. 21, and a description thereof will be omitted.

4. Process in Information Processing Apparatus (Device A) Functioning as License Providing Device The sequence of a proxy process in the information processing apparatus (device A) functioning as the license providing device 511 will be explained.

4.1 Whole Sequence of Proxy Process

Figure 6:
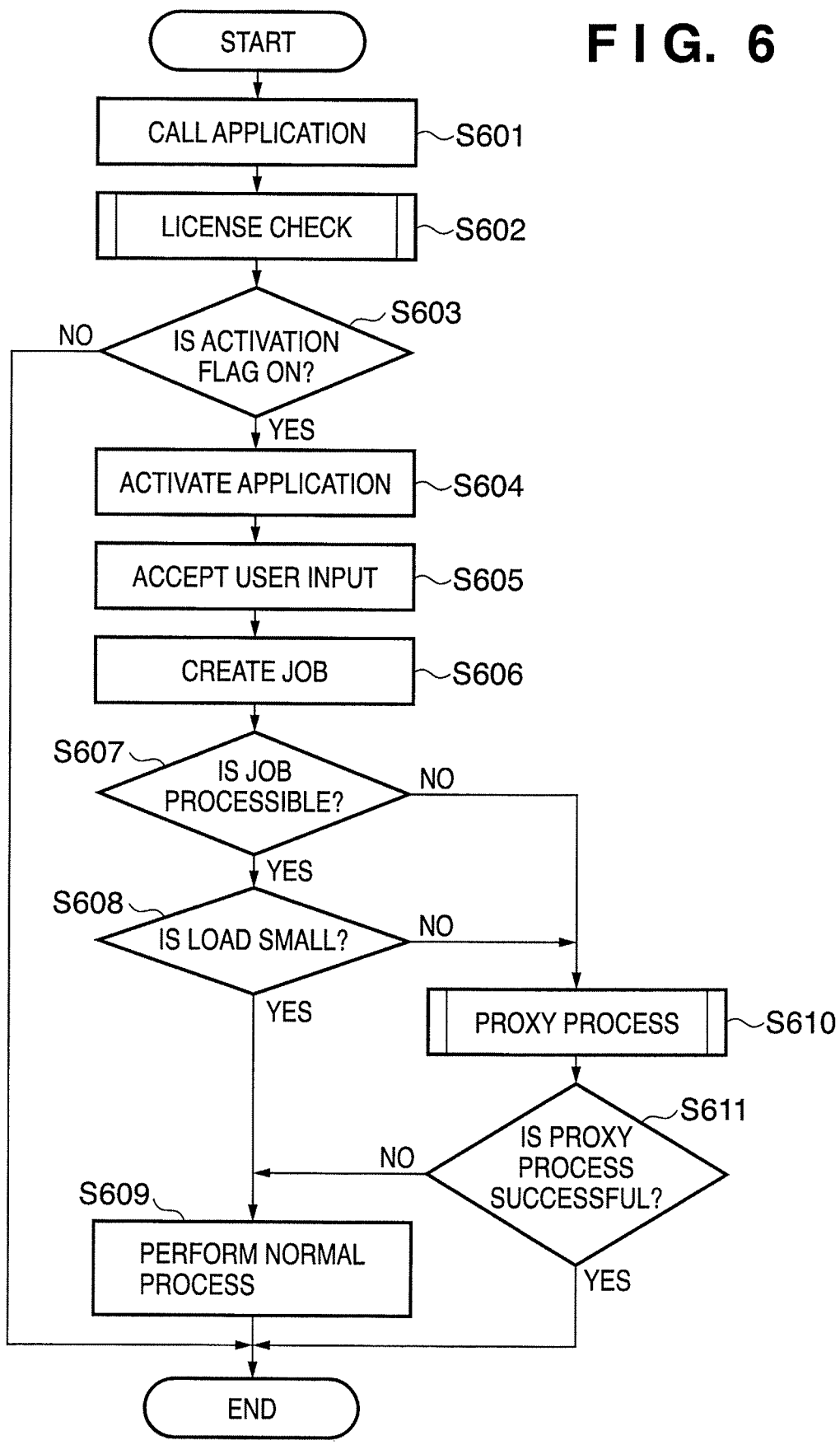
FIG. 6 is a flowchart showing the whole sequence in an information processing apparatus (device A) functioning as a license providing device in the network system shown in FIG. 4.

FIG. 6 shows the whole sequence in the information processing apparatus (device A) functioning as the license providing device in the network system shown in FIG. 4.

As shown in FIG. 6, when the user selects one of device applications from the input device 101 (step S601), it is checked whether there is a valid license corresponding to the selected device application (step S602).

After the check, an activation flag stored in the work area 305 is determined (step S603). If the activation flag is OFF, the process ends; if it is ON, the selected device application starts up to display an input window on the display device 104 (step S604).

An input necessary for the process is accepted from the user (step S605) to create a job (step S606). It is determined whether device A can currently process the created job (step S607). If it is determined that device A can process the created job, it is determined whether the load on device A is equal to or smaller than a predetermined threshold (step S608).

In step S607, whether device A can process the job is determined on the basis of whether an image forming program in the device provides something necessary for the job, and whether the device cannot physically process the job due to the absence of any sheet, a low toner state, a job error, or the like. Assume that device A is in at least one of a state in which the load on device A is larger than a specific value, a state in which device A does not incorporate any control program used for a job process, a state in which an error occurs in device A, and a state in which an error occurs for another job in device A. In this case, the license management unit uses the control program in device A to determine that device A cannot execute the process of the received job.

If it is determined that the load on device A is equal to or smaller than the predetermined threshold, the job is normally processed (step S609). If it is determined in step S607 that device A cannot process the created job, or it is determined in step S608 that the load is larger, the process advances to step S610 to perform the proxy process. In step S611, it is determined whether the proxy process is successful. If the proxy process fails, a normal process is performed (step S609); if the proxy process is successful, the process ends.

4.2 Sequence of License Check Process

Figure 7:
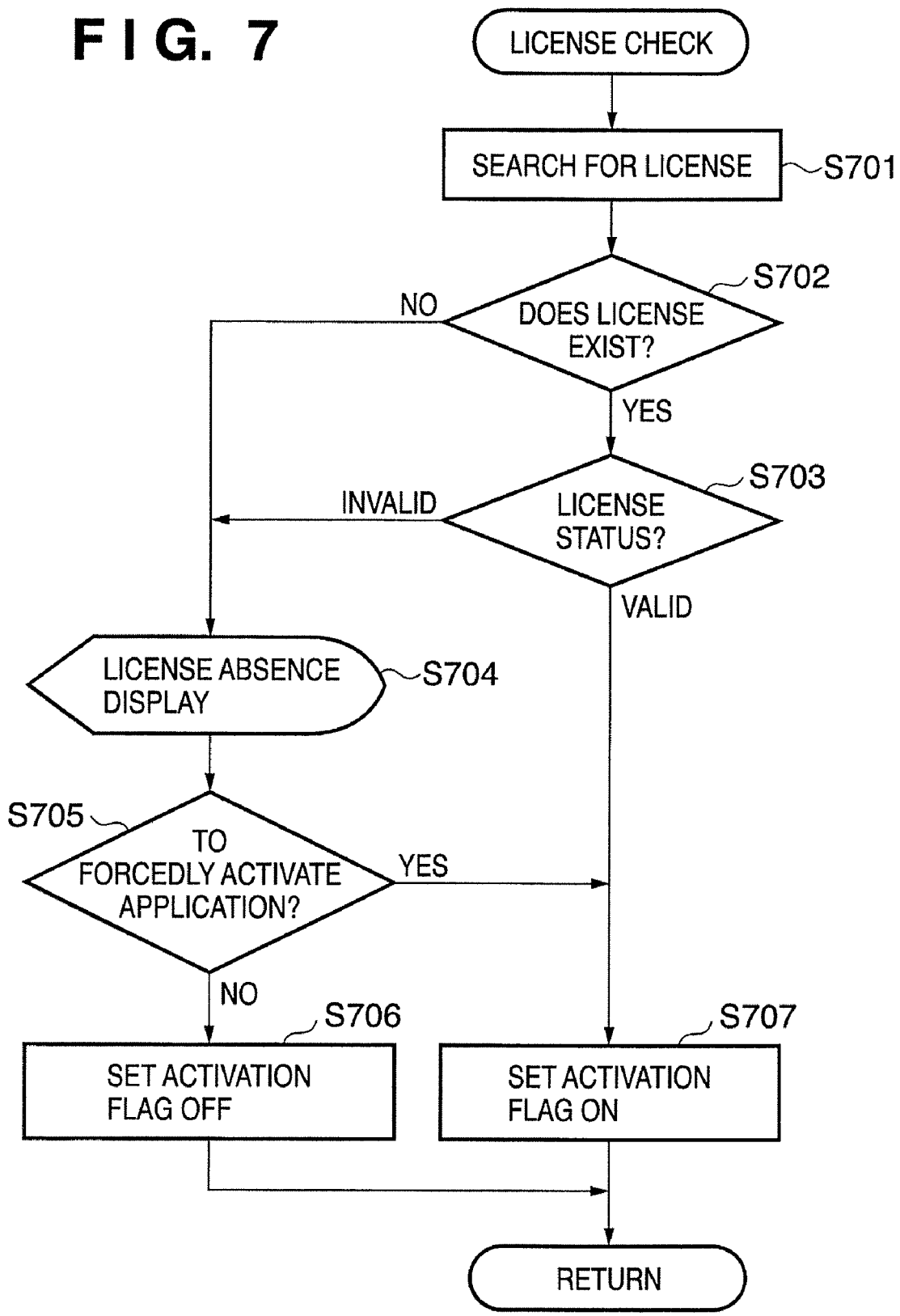
FIG. 7 is a flowchart showing the detailed sequence of a license check process.

FIG. 7 is a flowchart showing the detailed sequence of the license check process in step S602. The license management unit 513 executes this process. The license management unit 513 searches the license DB 514 (step S701) to determine whether there is a license (step S702), in order to determine whether a device application to be activated has already lost a necessary license.

If the license management unit 513 determines that there is a license, it determines whether the license is valid (step S703). If the license management unit 513 determines in step S702 that there is no license, or determines in step S703 that the license is invalid, the display device 104 displays a display window to represent that there is no license (step S704).

Figure 20:
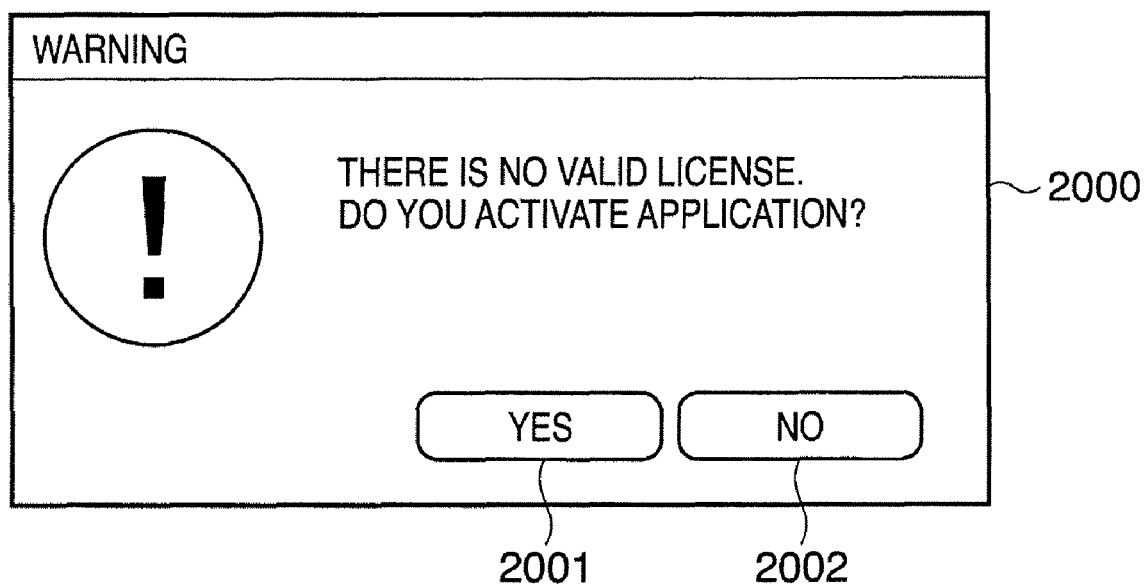
FIG. 20 is a view showing an example of a display window representing that there is no license.

In FIG. 20, reference numeral 2000 denotes an example of this display window. If the user selects "YES" 2001 in the display window 2000, device A can forcedly activate a device application without any license, implementing a license form like general shareware. However, the present invention is not limited to this, and may inhibit the user from selecting forced activation.

In step S705, the license management unit 513 determines a user input to the display window 2000 displayed in step S704. If the license management unit 513 determines that the input is not to forcedly activate the device application (the user presses "NO" 2002), it sets OFF the activation flag stored in the work area 305 (step S706) If the input is to forcedly activate the device application (the user presses the "YES" 2001), it sets the activation flag ON (step S707), and escapes from the process.

If the license management unit 513 determines in step S703 that the license is valid, it sets the activation flag ON (step S707), and escapes from the process.

4.3 Sequence of Proxy Process

Figure 8:
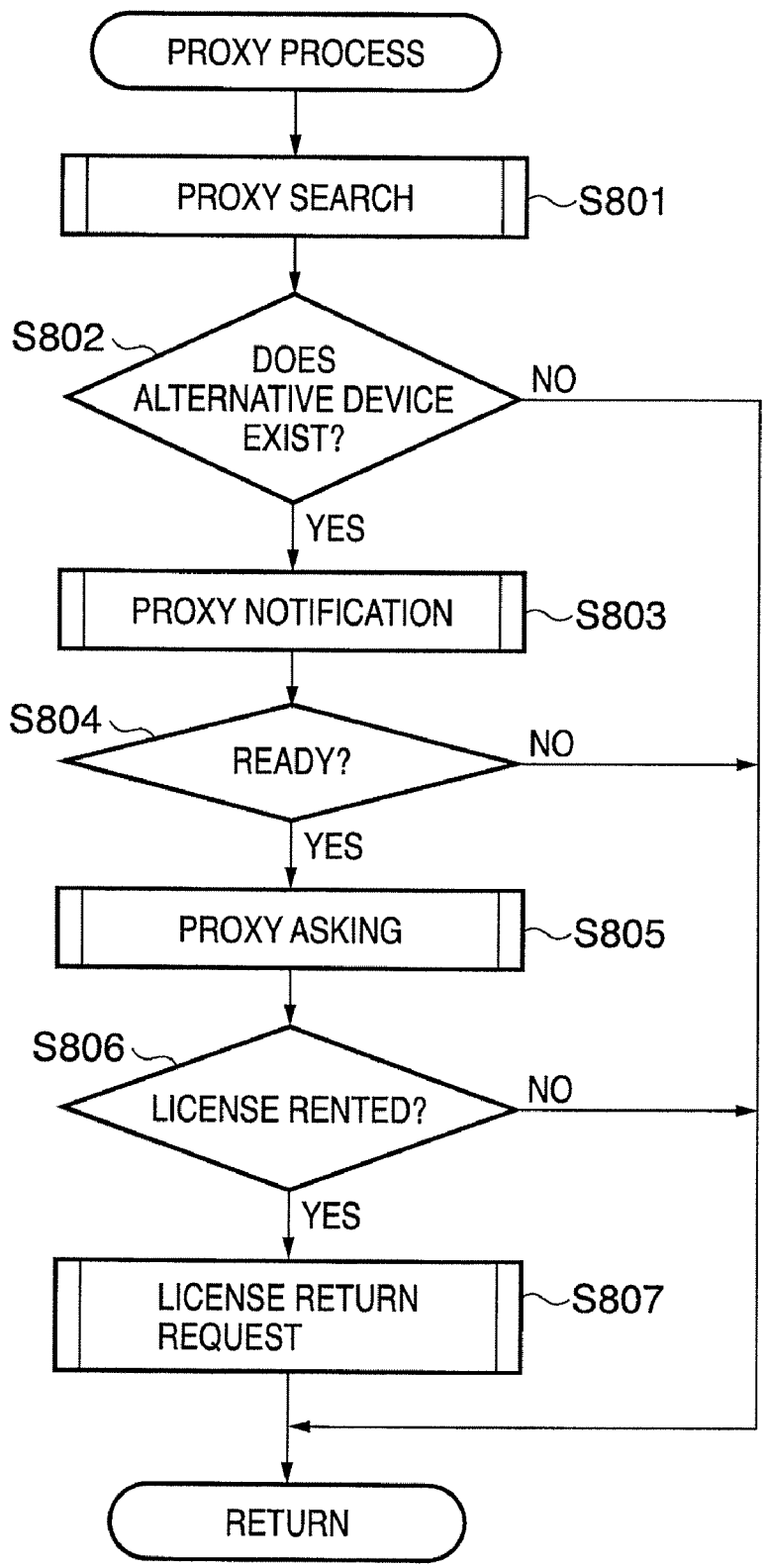
FIG. 8 is a flowchart showing the detailed sequence of a proxy process.

FIG. 8 is a flowchart showing the detailed sequence of the proxy process in step S610. The application platform (not shown in FIG. 5) of device A mainly performs this process. The application platform searches for an alternative device (step S801), and determines whether an alternative device has been detected (step S802).

If no alternative device has been detected, the application platform escapes from the process. If an alternative device has been detected, the application platform sends a proxy notification to the selected alternative device (device B) (step S803), and determines, on the basis of a reply to the notification, whether the alternative device (device B) is ready for the process (step S804).

If the application platform determines that the alternative device (device B) is not ready, it escapes from the process. If the application platform determines that the alternative device (device B) is ready, it asks the alternative device to execute a proxy process of the job (step S805). The application platform monitors the process by the alternative device, and at the end of the job process by the alternative device, determines whether the alternative device has rented the license (step S806). If the alternative device has rented the license, the application platform requests the alternative device to return the license (step S807), and then escapes from the process.

4.3.1 Sequence of Proxy Search Process

Figure 9:
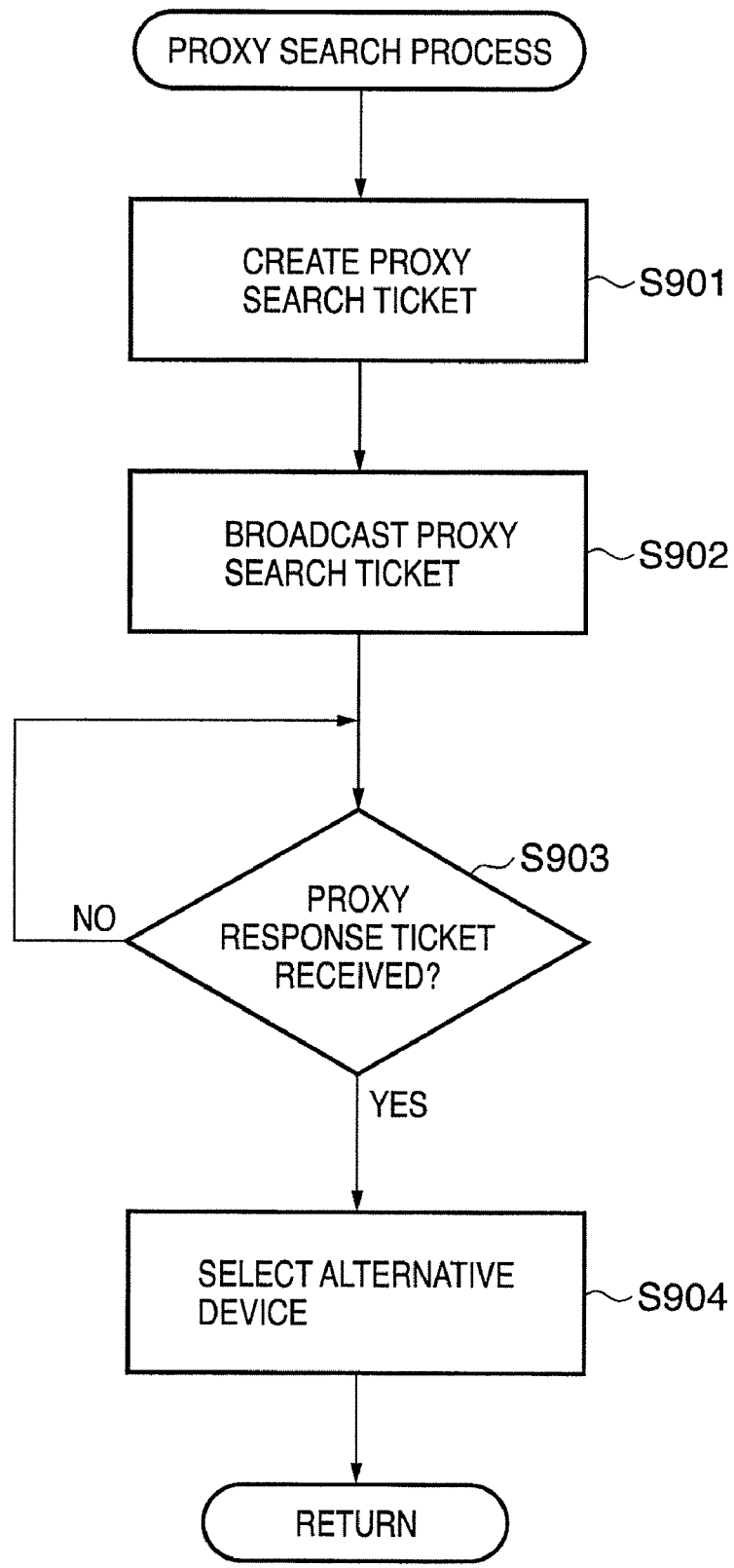
FIG. 9 is a flowchart showing the sequence of a proxy search process.
Figure 22:
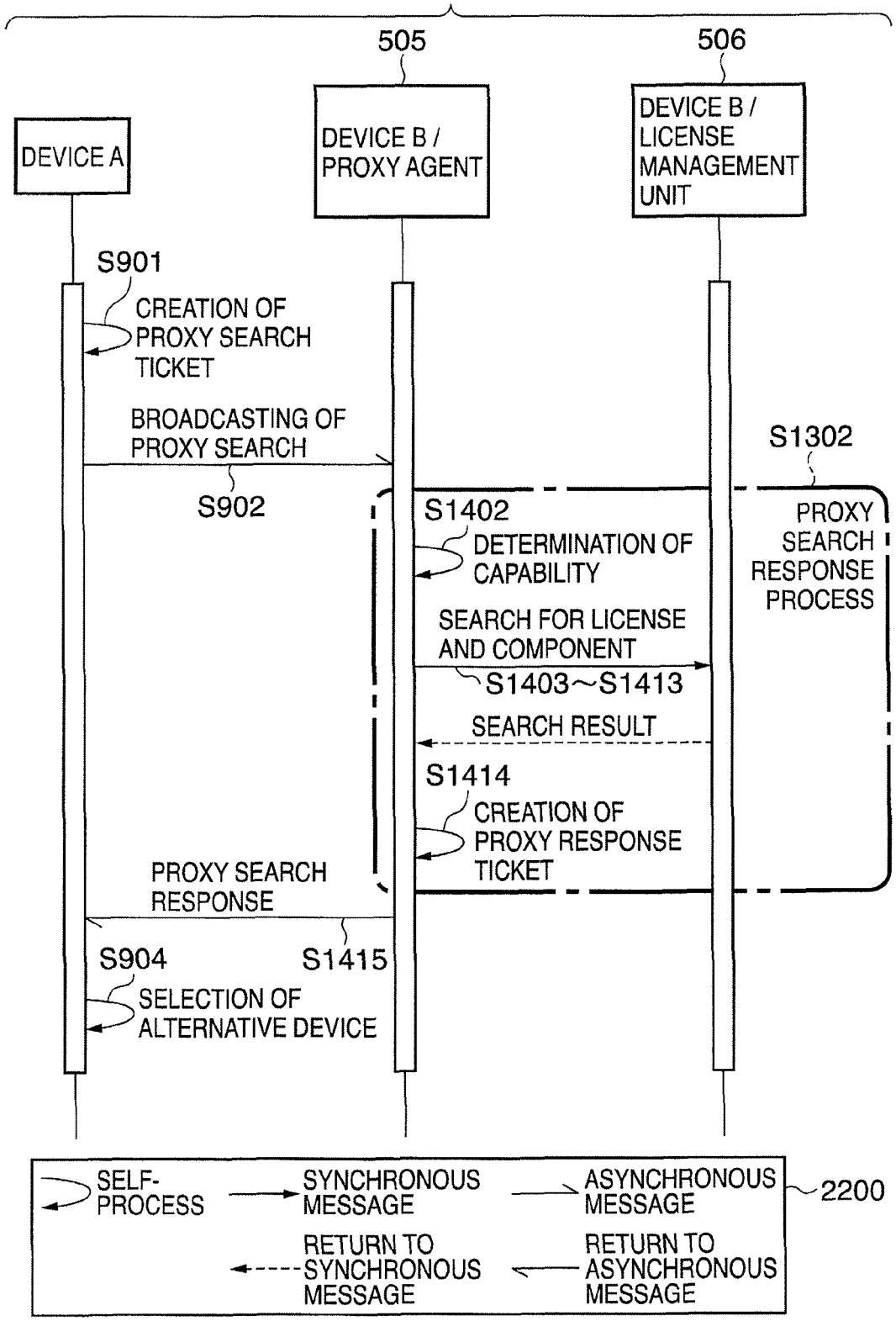
FIG. 22 is a chart showing the sequence of the proxy search process in device A and the proxy search process in device B.

FIG. 9 is a flowchart showing the detailed sequence of the proxy search process in step S801. As a reference, FIG. 22 is a flowchart additionally showing a corresponding process (proxy search response process, details of which will be described later) in device B when executing the proxy search process. The sequence in FIG. 9 will be explained with reference to FIG. 22 (reference numerals shown in FIG. 22 correspond to those shown in FIG. 9). The meanings of signs in FIG. 22 are given in explanatory note 2200.

In step S901, the application platform creates a proxy search ticket. The proxy search ticket is a ticket describing conditions to execute a proxy process of a job in order to select, from information processing apparatuses connected to the network 107, an information processing apparatus (alternative device) which is to execute the proxy process.

Figure 26:
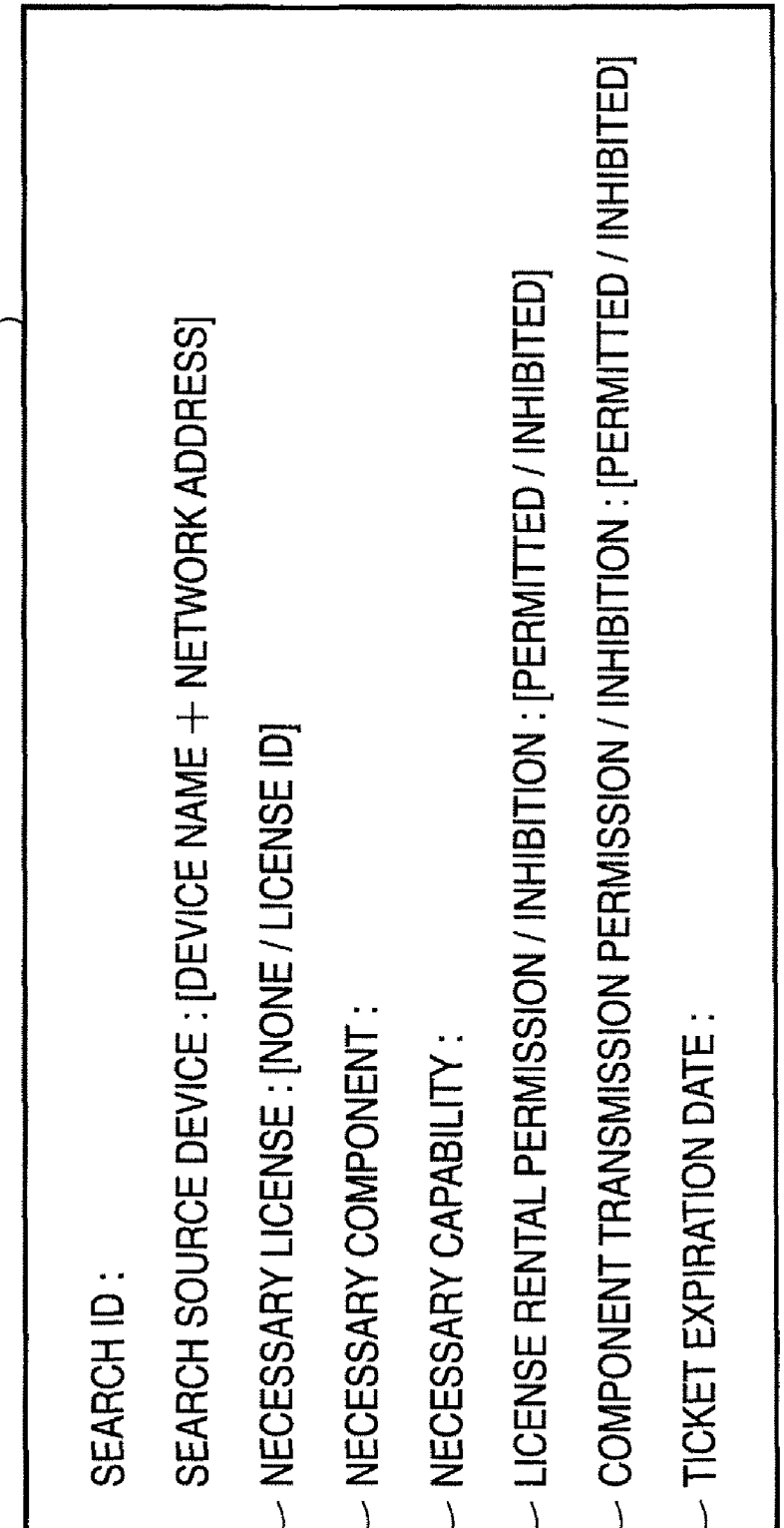
FIG. 26 is a view showing an example of a proxy search ticket.

In FIG. 26, reference numeral 2600 denotes an example of a proxy search ticket. The proxy search ticket 2600 is created on the basis of information such as the license form and necessary capability which are set in advance for each device application for use. The alternative device conditions include a necessary license 2601, necessary component 2602, necessary capability 2603, license rental permission/inhibition 2604, component transmission permission/inhibition 2605, and ticket expiration date 2606. The necessary capability 2603 means a device function such as FAX transmission, color printing, or stapling.

Referring back to FIGS. 9 and 22, the application platform broadcasts the created proxy search ticket 2600 as a proxy search message to the network 107 in step S902. Upon reception of the proxy search message, an information processing apparatus executes a proxy search response process. Details of the proxy search response process will be described later.

In step S903, the application platform waits for a response (proxy search response message) from the information processing apparatus which has received the proxy search message.

If the application platform determines in step S903 that it has received the proxy search response message, the process advances to step S904. In step S904, the application platform selects an alternative device (device B) from a plurality of information processing apparatuses which have transmitted proxy search response messages.

More specifically, the application platform selects a ticket whose conditions are more proper from proxy search response tickets contained in proxy search response messages received within a preset time. The application platform sets the device which has transmitted this ticket as an alternative device. For example, when there are a proxy search response ticket which requires rental of a license and a proxy search response ticket which does not require rental of a license, the proxy search response ticket which does not require rental of a license is selected. If no proxy search response message is sent within a preset time or there is no proxy search response message of permissible conditions, the proxy process fails, and the application platform escapes from the process. In the embodiment, device B is selected as an alternative device.

4.3.2 Proxy Notification Process

Figure 10:
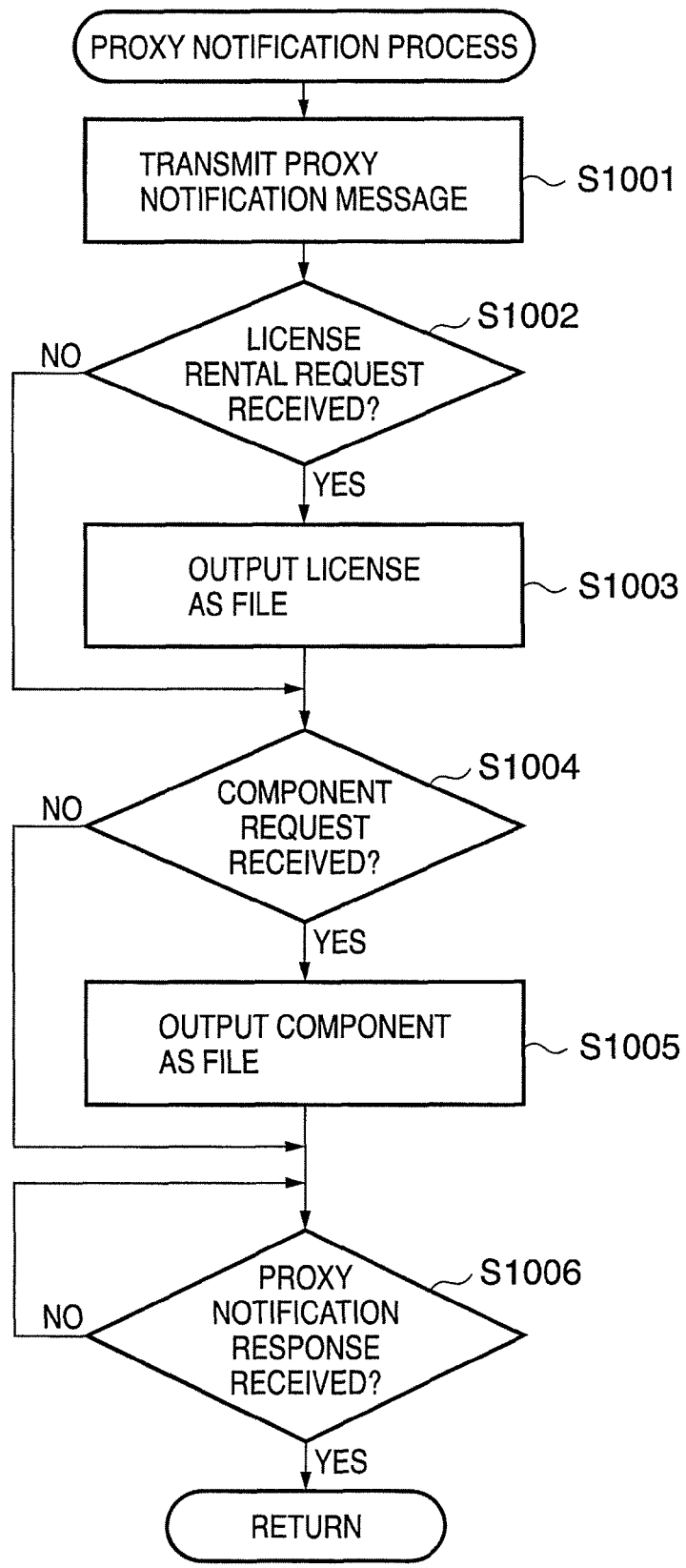
FIG. 10 is a flowchart showing the sequence of a proxy notification process.
Figure 23:
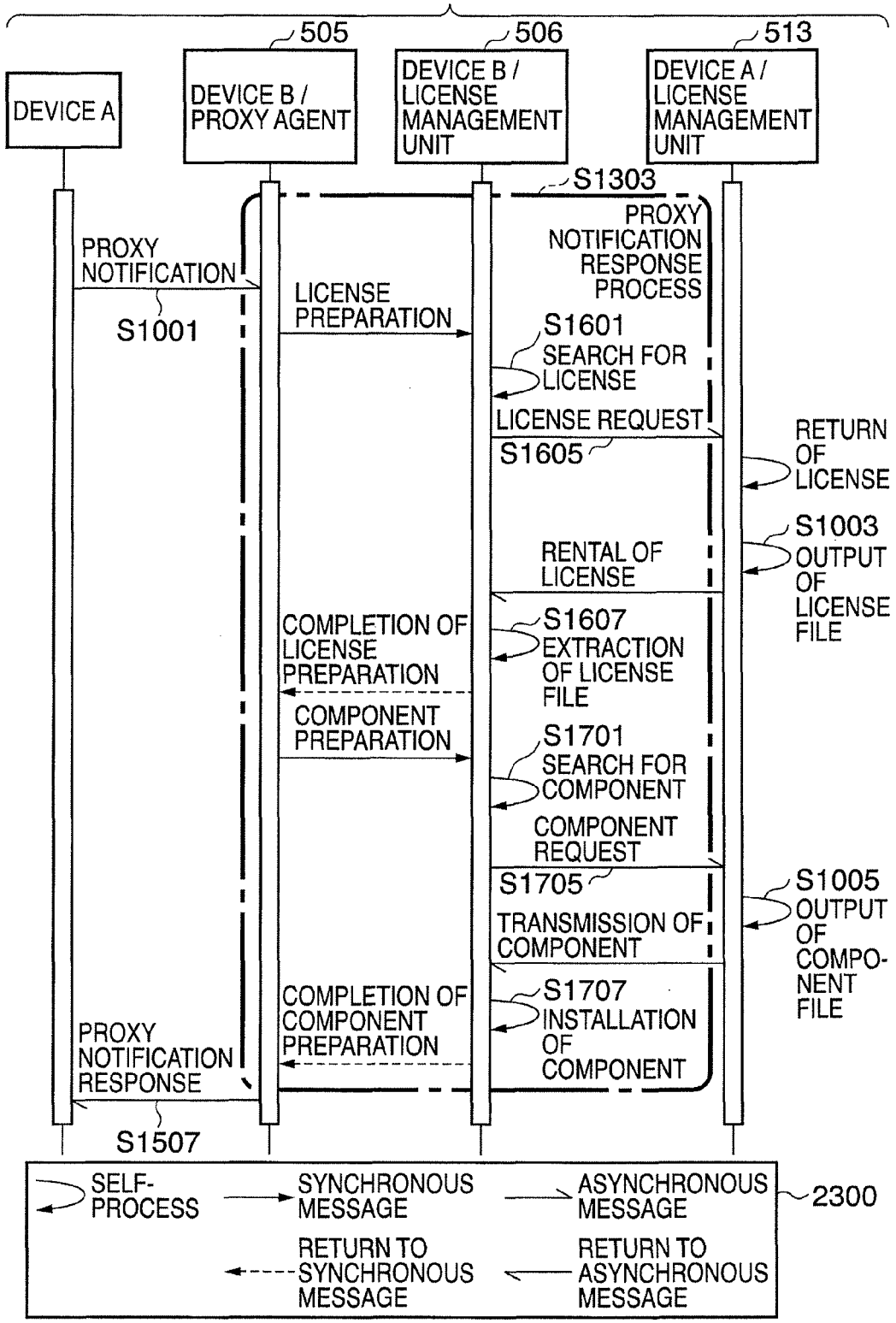
FIG. 23 is a chart showing the sequence of the proxy notification process in device A and the proxy notification response process in device B.

The proxy notification process (step S803) will be explained. FIG. 10 is a flowchart showing the detailed sequence of the proxy notification process in step S803. As a reference, FIG. 23 is a flowchart additionally showing a corresponding process (proxy notification response process, details of which will be described later) in device B when executing the proxy notification process. The sequence in FIG. 10 will be explained with reference to FIG. 23 (reference numerals shown in FIG. 23 correspond to those shown in FIG. 10). The meanings of signs in FIG. 23 are given in explanatory note 2300.

In step S1001, the application platform transmits a proxy notification message together with the search ID of a proxy search ticket to device B serving as an alternative device selected in the proxy search process (step S801). Upon reception of the proxy notification message, device B executes a proxy notification response process. Details of the proxy notification response process will be described later.

In step S1002, the application platform determines whether it has received a license rental request from device B. If the application platform determines that it has received a license rental request, the process advances to step S1003. In step S1003, the license management unit 513 outputs some or all of valid licenses held by it as a file, and transmits them to the license management unit 506 of requesting device B.

In step S1004, the application platform determines whether it has received a component request from device B. If the application platform determines that it has received a component request, the process advances to step S1005. In step S1005, the application platform outputs a component as a file.

In step S1006, the application platform waits for a response (proxy notification response message) to the transmitted proxy notification message. If the application platform determines in step S1006 that it has received the proxy notification response message, the process ends.

4.3.3 Proxy Asking Process

Figure 11:
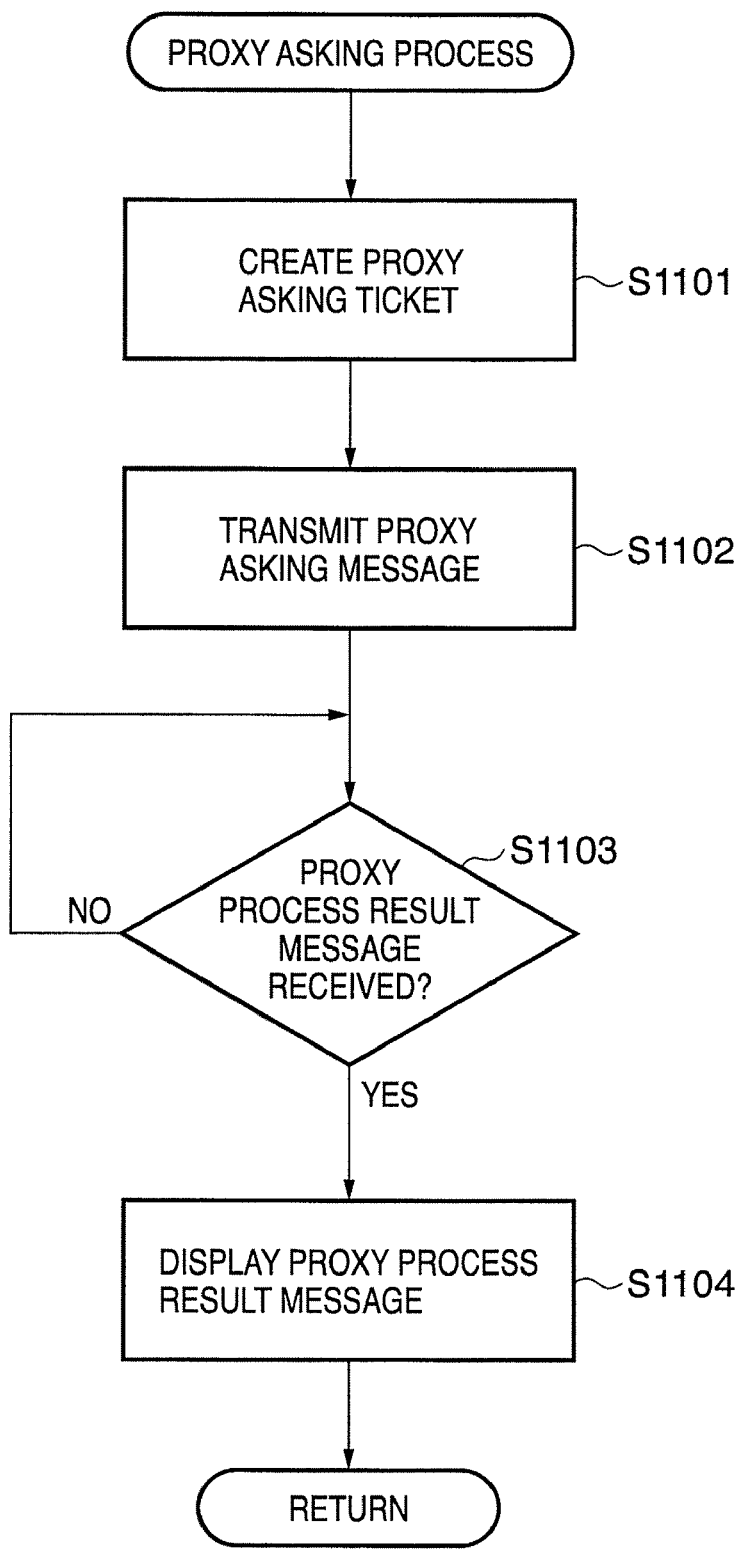
FIG. 11 is a flowchart showing the sequence of a proxy asking process.
Figure 24:
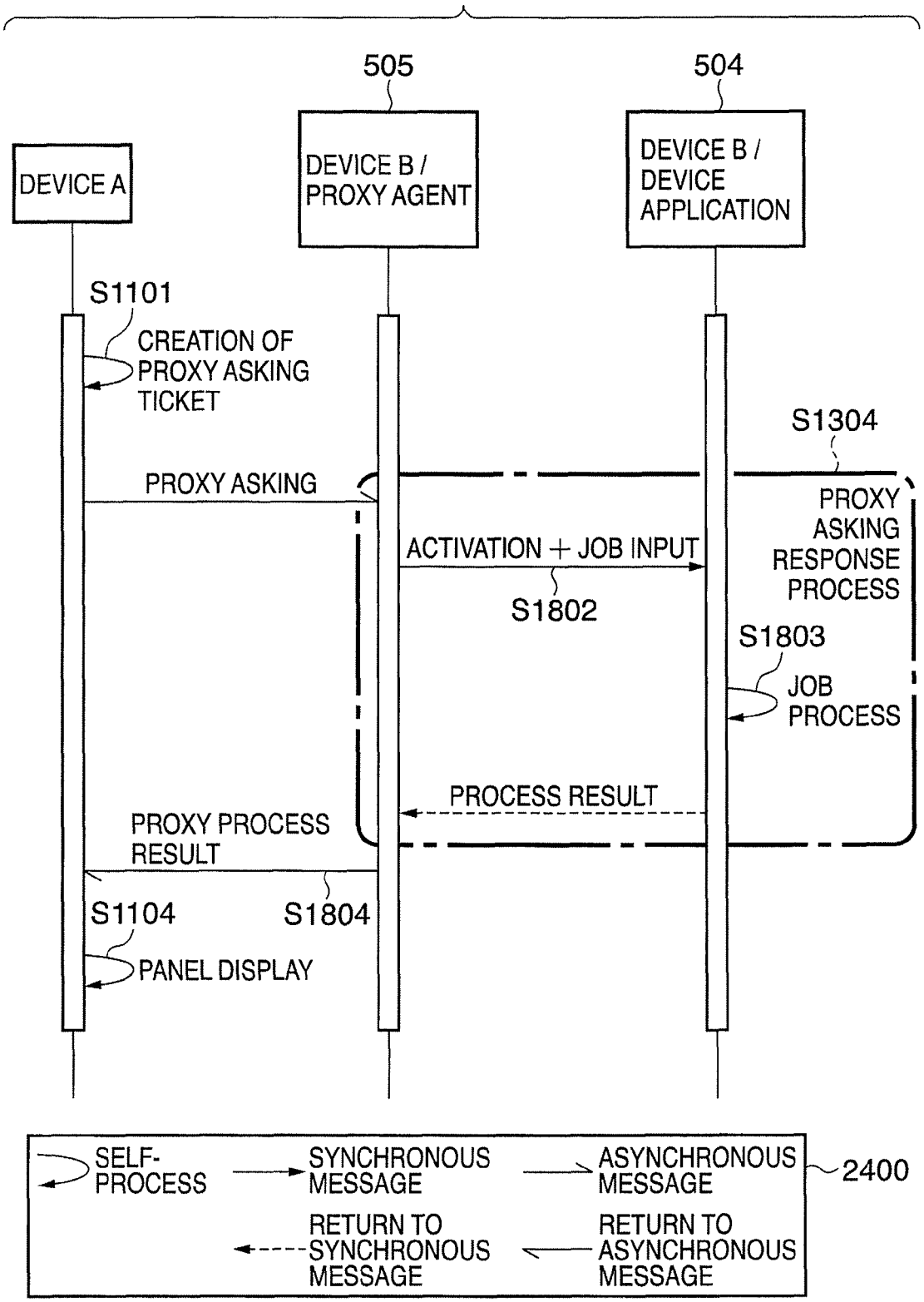
FIG. 24 is a chart showing the sequence of the proxy asking process in device A and the proxy asking response process in device B.

The proxy asking process (step S805) will be described. FIG. 11 is a flowchart showing the detailed sequence of the proxy asking process in step S805. As a reference, FIG. 24 is a flowchart additionally showing a corresponding process (proxy asking response process, details of which will be described later) in device B when executing the proxy asking process. The sequence in FIG. 11 will be explained with reference to FIG. 24 (reference numerals shown in FIG. 24 correspond to those shown in FIG. 11). The meanings of signs in FIG. 24 are given in explanatory note 2400.

In step S1101, the application platform creates a proxy asking ticket. In FIG. 28, reference numeral 2800 denotes an example of the proxy asking ticket. The proxy asking ticket stores a necessary license 2801, a necessary component 2802, a necessary capability 2803, and job input information 2804 (data itself or a data storage location). The proxy asking ticket also stores job output information 2805 (data returning method representing whether to send back a process result message in response to a proxy asking message or store data at a predetermined location).

In step S1102, the application platform adds the created proxy asking ticket 2800 to the proxy asking message, and transmits the proxy asking message to device B serving as an alternative device. Upon reception of the proxy asking message, device B executes a proxy asking response process. Details of the proxy asking response process will be described later.

In step S1103, the application platform waits for a response (proxy process result message) from device B to the proxy asking message. If the application platform determines in step S1103 that it has received the proxy process result message, the process advances to step S1104. In step S1104, the display device 104 displays the contents of the proxy process result message, such as a final output device name and error information, as needed.

4.3.4 License Return Request Process

Figure 12:
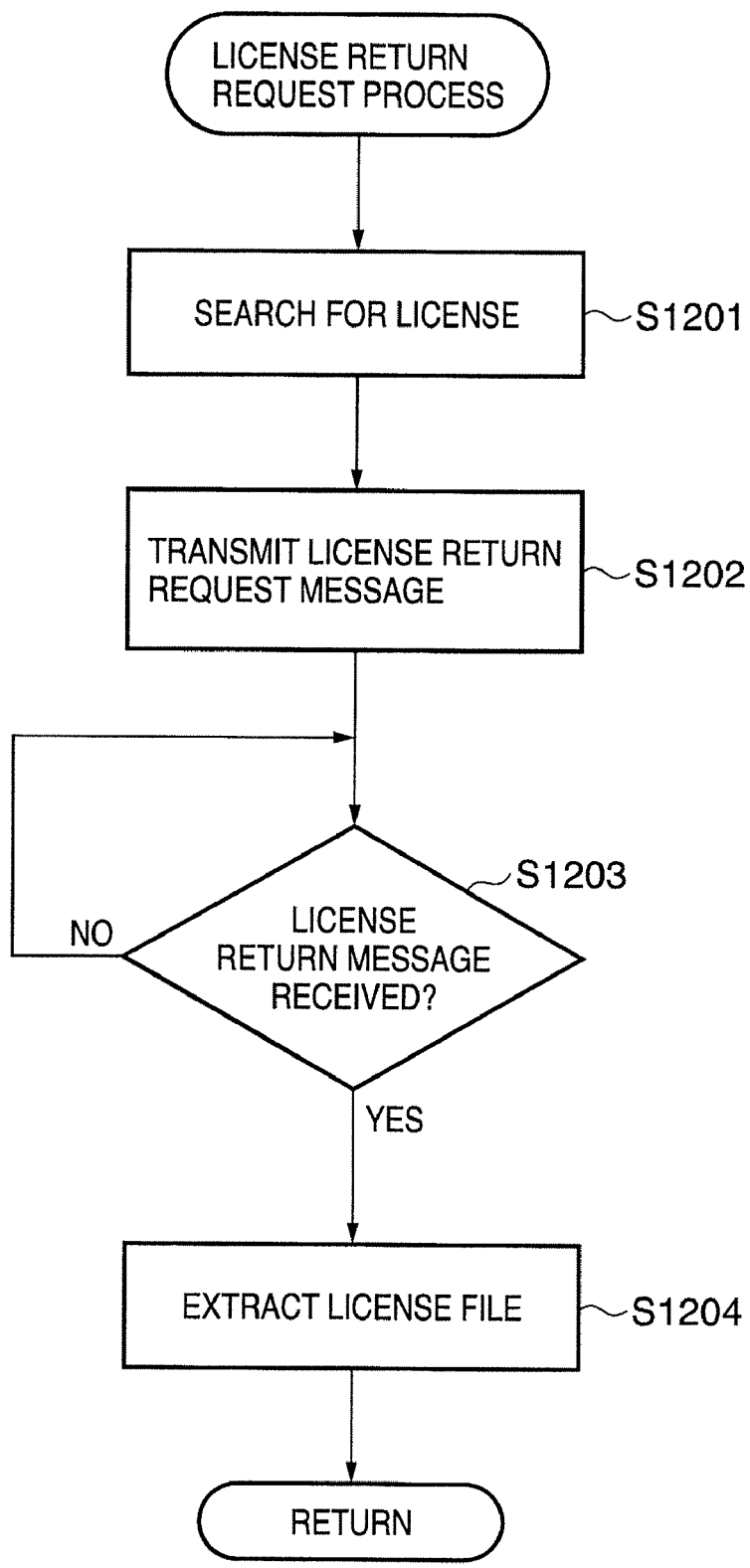
FIG. 12 is a flowchart showing the sequence of a license return request process.
Figure 25:
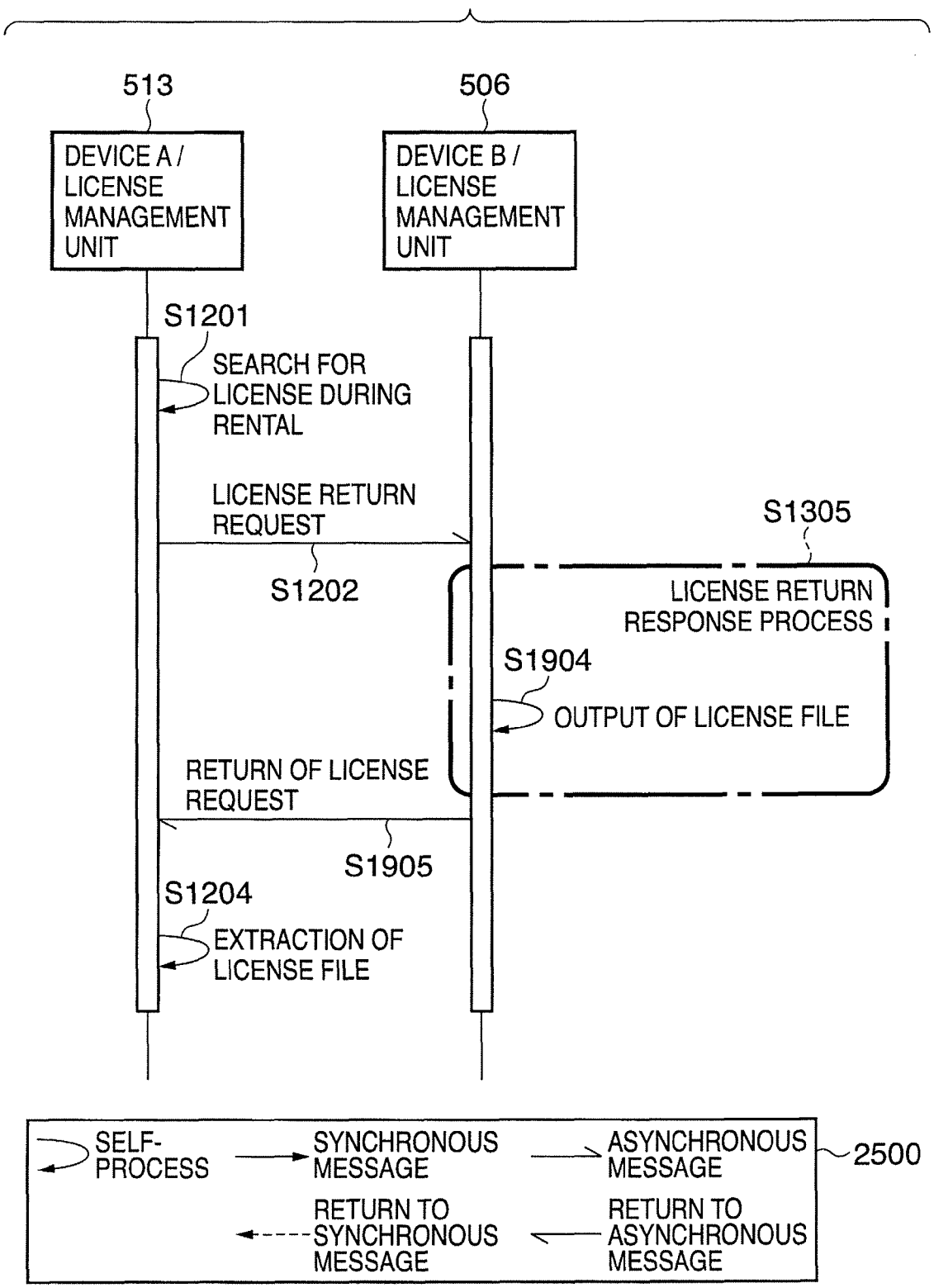
FIG. 25 is a chart showing the sequence of the license return request process in device A and the license return response process in device B.

The license return request process (step S807) will be explained. FIG. 12 is a flowchart showing the detailed sequence of the license return request process in step S807. As a reference, FIG. 25 is a flowchart additionally showing a corresponding process (license return response process, details of which will be described later) in device B when executing the license return request process. The sequence in FIG. 12 will be explained with reference to FIG. 25 (reference numerals shown in FIG. 25 correspond to those shown in FIG. 12). The meanings of signs in FIG. 25 are given in explanatory note 2500.

In step S1201, the application platform searches for a license rented to device B. More specifically, the application platform searches the license DB 514 for a license during rental with a license identifier necessary for the device application.

In step S1202, the application platform adds a license identifier to the license return request message, and transmits the license return request message to device B serving as the rental destination device of the license during rental. Upon reception of the license return request message, device B executes a license return response process. Details of the license return response process will be described later.

In step S1203, the application platform waits for a response (license return message) from device B to the license return request message. If the application platform determines in step S1203 that it has received the license return message, the process advances to step S1204 to extract a license file contained in the received license return message.

5. Sequence of Process in Information Processing Apparatus Functioning as Application Operating Device The sequence of a proxy process in the information processing apparatus (device B) functioning as the application operating device 501 will be explained.

5.1 Whole Sequence of Proxy Process

Figure 13:
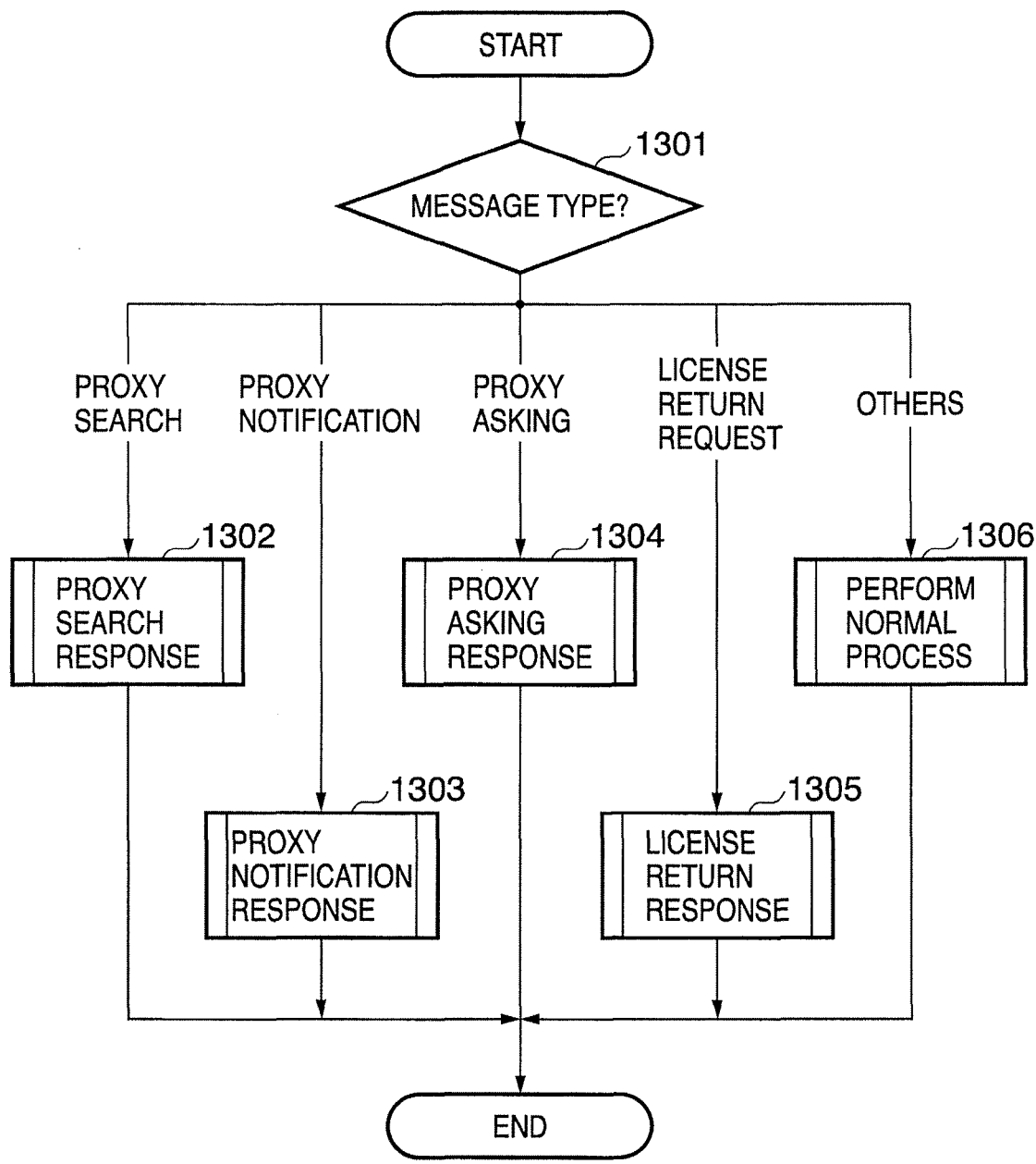
FIG. 13 is a flowchart showing the whole sequence in an information processing apparatus (device B) functioning as an application operating device in the network system shown in FIG. 4.

FIG. 13 shows the whole sequence in the information processing apparatus (device B) functioning as the application operating device 501 in the network system shown in FIG. 4.

As shown in FIG. 13, the process starts when the information processing apparatus functioning as the application operating device receives a proxy search message, proxy notification message, proxy asking message, or license return request message. Upon reception of each message, the device platform 502 transfers the message to the proxy agent 505 and license management unit 506. The proxy agent 505 and license management unit 506 respond to the message, and then the process starts.

More specifically, the type of received message is determined (step S1301). If the message is a proxy search message, the proxy search response process is executed (step S1302). If the message is a proxy notification message, the proxy notification response process is executed (step S1303). If the message is a proxy asking message, the proxy asking response process is executed (step S1304). If the message is a license return request message, the license return response process is executed (step S1305). If the message is another one, a normal process is performed (step S1306). Details of each process will be explained below.

5.2 Sequence of Proxy Search Response Process

Figure 14:
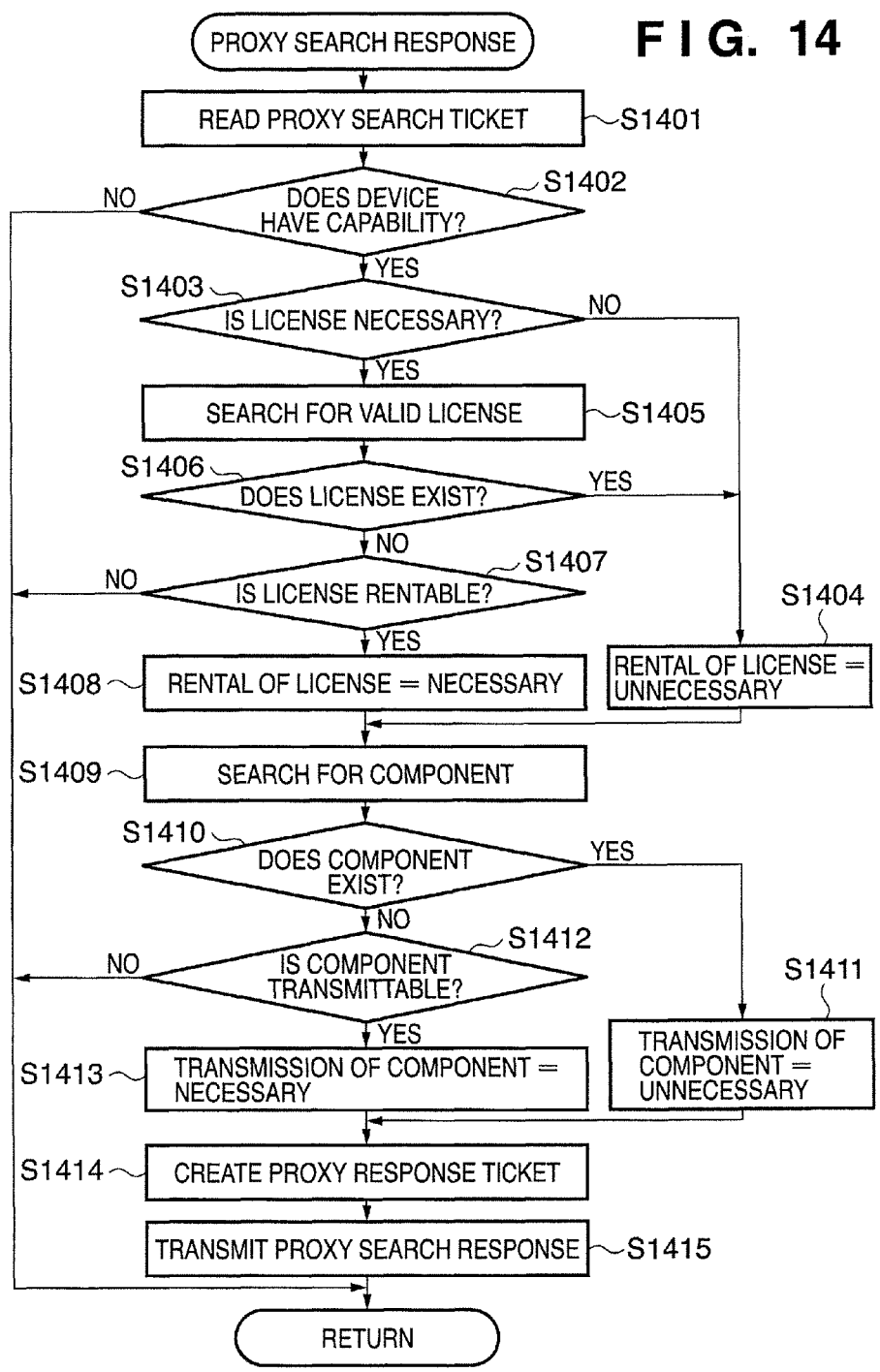
FIG. 14 is a flowchart showing the sequence of a proxy search response process.

The proxy search response process (step S1302) will be described. FIG. 14 is a flowchart showing the detailed sequence of the proxy search response process (step S1302). The proxy agent 505 and license management unit 506 perform the proxy search response process. The following description also refers to the flowchart of FIG. 22 additionally showing the proxy search process (step S801) in device A (reference numerals shown in FIG. 22 correspond to those shown in FIG. 9).

When the proxy search ticket 2600 representing alternative device conditions is added to proxy search message to broadcast the proxy search message, the proxy agent 505 reads the received proxy search ticket 2600 and stores it in the work area 305 in step S1401. The proxy search ticket 2600 is kept held till the ticket expiration date described in the proxy search ticket 2600, and when the expiration date has passed, discarded at an arbitrary timing. The proxy agent 505 of device B and the license management unit 506 of device B may exist in the same device B or separately in physically different devices.

When the reply from device B is that device B has a program necessary for a job process but does not have any license file, device A may output the above-mentioned authority data. The reply from device B may be that device B has neither a control program necessary for a job process nor authority data. In this case, device A may output a component and license file serving as a control program necessary for the job process.

It is determined whether device B has the necessary capability 2603 stored in the proxy search ticket 2600 (step S1402). If device B does not have the necessary capability 2603, it escapes from the process. If device B has the necessary capability 2603, it is determined whether the necessary license 2601 stored in the proxy search ticket 2600 is "none" (step S1403). If the necessary license 2601 is "none", a license flag stored in the work area 305 is set OFF (which means that no license need be rented) (step S1404).

If the necessary license 2601 is not "none", the license management unit 506 searches for a valid license (step S1405) in order to determine whether device B has a valid license. It is determined on the basis of the search result whether there is a license (step S1406) If it is determined that the license search result is "present", the process shifts to step S1404.

If it is determined that the license search result is "absent", it is determined whether the license rental permission/inhibition 2604 stored in the proxy search ticket 2600 is "permitted" (step S1407). If the rental permission/inhibition 2604 is "inhibited", device B escapes from the process. If the rental permission/inhibition 2604 is "permitted", the license flag is set ON (which means that a license needs to be rented) (step S1408).

After the end of step S1404 or S1408, the same process as that (steps S1404 to S1408) for a license is done for a component. The license management unit 506 searches for a component (step S1409) in order to determine whether device B has the necessary component 2602 stored in the proxy search ticket 2600. It is determined on the basis of the search result whether there is a component (step S1410).

If it is determined that the component search result is "present", a component flag stored in the work area 305 is set OFF (which means that no component need be transmitted) (step S1411). If it is determined that the component search result is "absent", it is determined whether the component transmission permission/inhibition 2605 stored in the proxy search ticket 2600 is "permitted" (step S1412). If the component transmission permission/inhibition 2605 is "inhibited", device B escapes from the process.

If the component transmission permission/inhibition is "permitted", the component flag is set ON (which means that a license needs to be transmitted) (step S1413). After the end of step S1411 or S1413, a proxy response ticket is created from the license flag and component flag (step S1414).

In FIG. 27, reference numeral 2700 denotes an example of a proxy search response ticket. The conditions to execute the proxy process include license rental necessity/non-necessity 2701 and component transmission necessity/non-necessity 2702.

In step S1415, the proxy search response ticket 2700 created in step S1414 is added to a proxy search response message to transmit the proxy search response message to device A.

A ticket expiration date 2703 of the proxy search response ticket 2700 is the same as that of the corresponding proxy search ticket 2600. The proxy search response ticket 2700 is kept held till the ticket expiration date 2703, and when the expiration date has passed, discarded at an arbitrary timing.

5.3 Sequence of Proxy Notification Response Process

Figure 15:
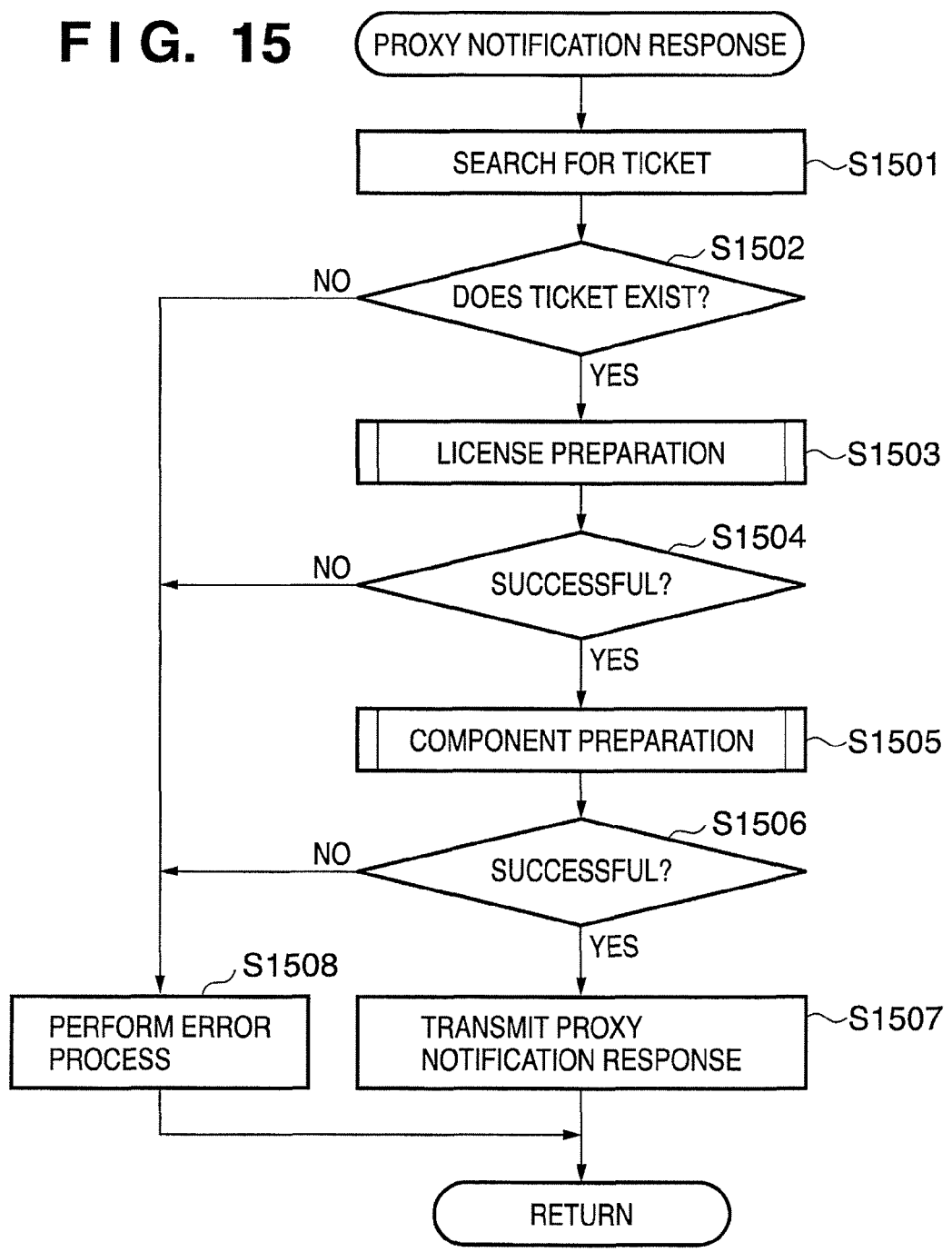
FIG. 15 is a flowchart showing the sequence of a proxy notification response process.

The proxy notification response process (step S1303) will be described. FIG. 15 is a flowchart showing the detailed sequence of the proxy notification response process (step S1303) in device B. The proxy agent 505 and license management unit 506 perform this process. The following description also refers to the flowchart of FIG. 23 additionally showing the proxy notification process (step S803) in device A (reference numerals shown in FIG. 23 correspond to those shown in FIGS. 15 to 17).

A plurality of proxy search tickets 2600 which have arrived at device B so far and are stored in the work area 305 of device B are searched for a ticket having a search ID transmitted together with a proxy notification message (step S1501). In step S1502, it is determined whether a ticket having the search ID has been detected.

If the ticket has already expired and was discarded, no proxy search ticket having the search ID is detected. When no proxy search ticket having the search ID is detected, an error process is performed (step S1508), and device B escapes from the process. If a proxy search ticket is detected, the process advances to step S1503. In step S1503, a license is prepared on the basis of information on a license and component stored in the proxy search ticket, and the process advances to step S1504. In step S1504, it is determined whether the preparation for the license is successful.

If the preparation for the license is successful, the process advances to step S1505 to prepare a component. In step S1506, it is determined whether the preparation for the component is successful. If the preparation for the component is successful device B transmits a proxy notification response message to device A (step S1507). If it is determined in step S1504 or S1506 that the preparation has failed, an error process is executed (step S1508), and device B escapes from the process.

5.3.1 Sequence of License Preparation Process

Figure 16:
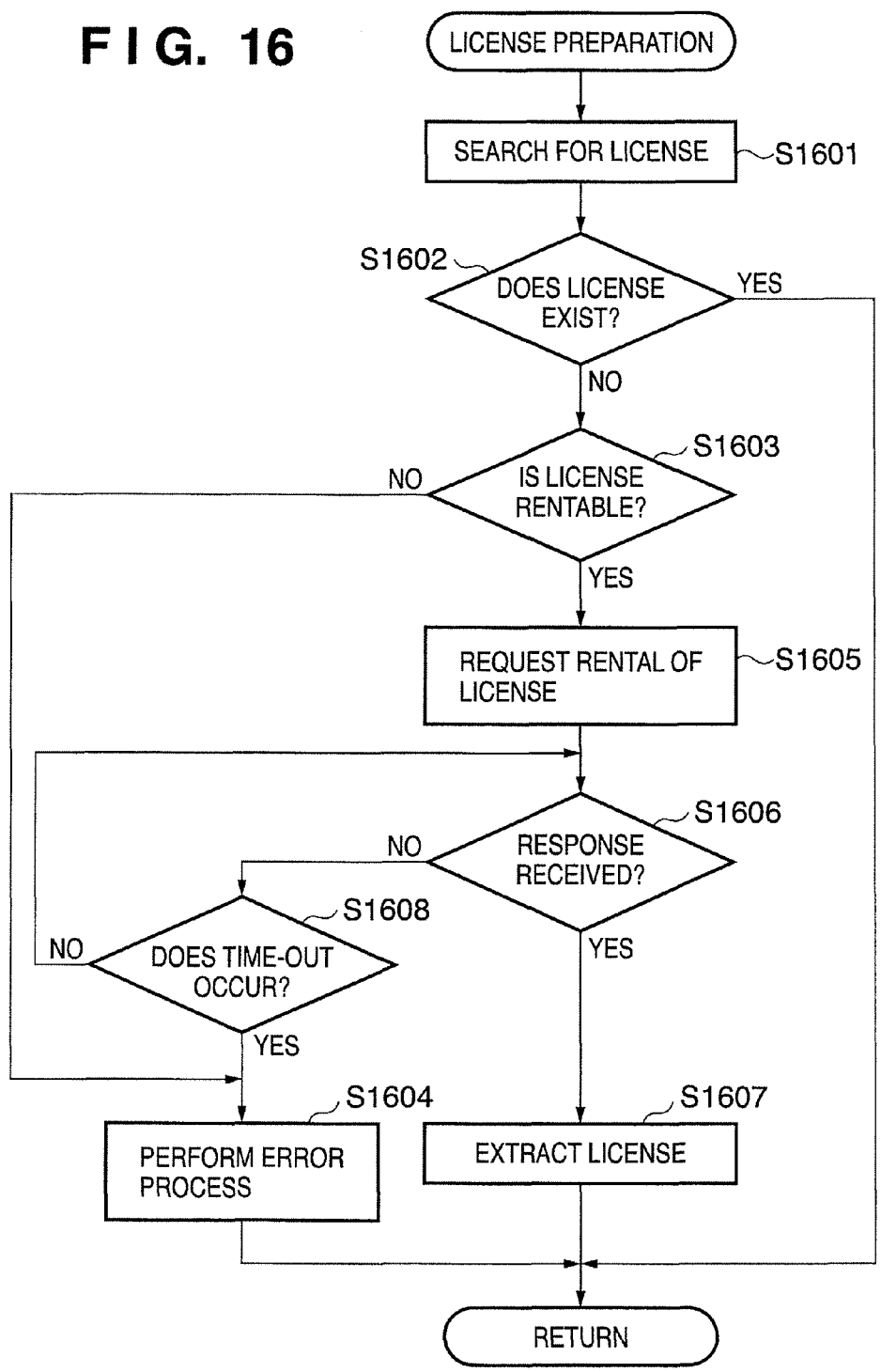
FIG. 16 is a flowchart showing the sequence of a license preparation process.

FIG. 16 shows the detailed sequence of the license preparation process (step S1503). The license management unit 506 performs this process.

Steps S1601 to S1603 follow the same sequence as that of steps S1404 to S1408 (FIG. 14) in the proxy search response process (step S1302). In steps S1601 to S1603, the license management unit 506 determines whether there is a valid license and the license can be rented.

If the license management unit 506 determines in step S1602 that there is a valid license, the license is ready, and the license management unit 506 escapes from the process. If the license management unit 506 determines in step S1603 that the license can be rented, it requests the license management unit 513 of device A to rent a license (step S1605).

The license management unit 506 of device B determines whether it has received a response to the license rental request (step S1606). If the license management unit 506 has received the response, it extracts and validates the transmitted license file (step S1607).

If the license management unit 506 has not received any response, it determines whether the current time has not exceeded a preset time (whether a time-out occurs) (step S1608). The license management unit 506 waits for the response till the time-out. If a time-out occurs, the license management unit 506 performs an error process (step S1604), and escapes from the process.

In the embodiment, it is determined in the proxy search response process (step S1302) that a license needs to be rented. Thus, a proxy response ticket has already been transmitted to device A, and device B has already been selected as an alternative device. In general, it is not determined in step S1603 that no license can be rented. Even in this case, if it is determined that no license can be rented, the license management unit 506 performs an error process (step S1604), and escapes from the process.

5.3.2 Sequence of Component Preparation Process

Figure 17:
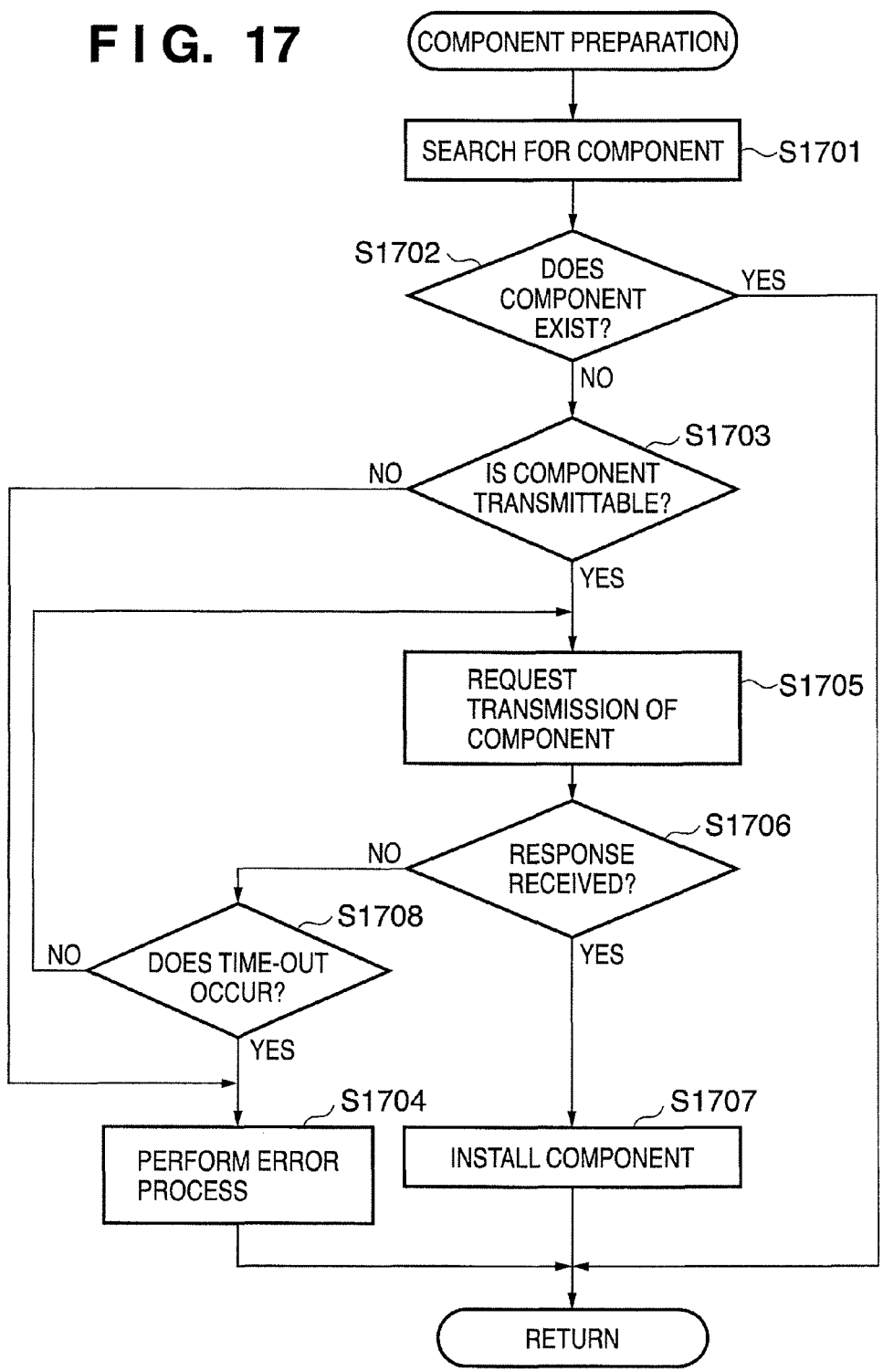
FIG. 17 is a flowchart showing the detailed sequence of a component preparation process.

FIG. 17 shows the detailed sequence of the component preparation process (step S1505). This process follows almost the same sequence as that of the license preparation process (step S1503) in FIG. 15 except that the process target changes from a license to a component. A detailed description of the component preparation process will be omitted.

5.4 Proxy Asking Response Process

Figure 18:
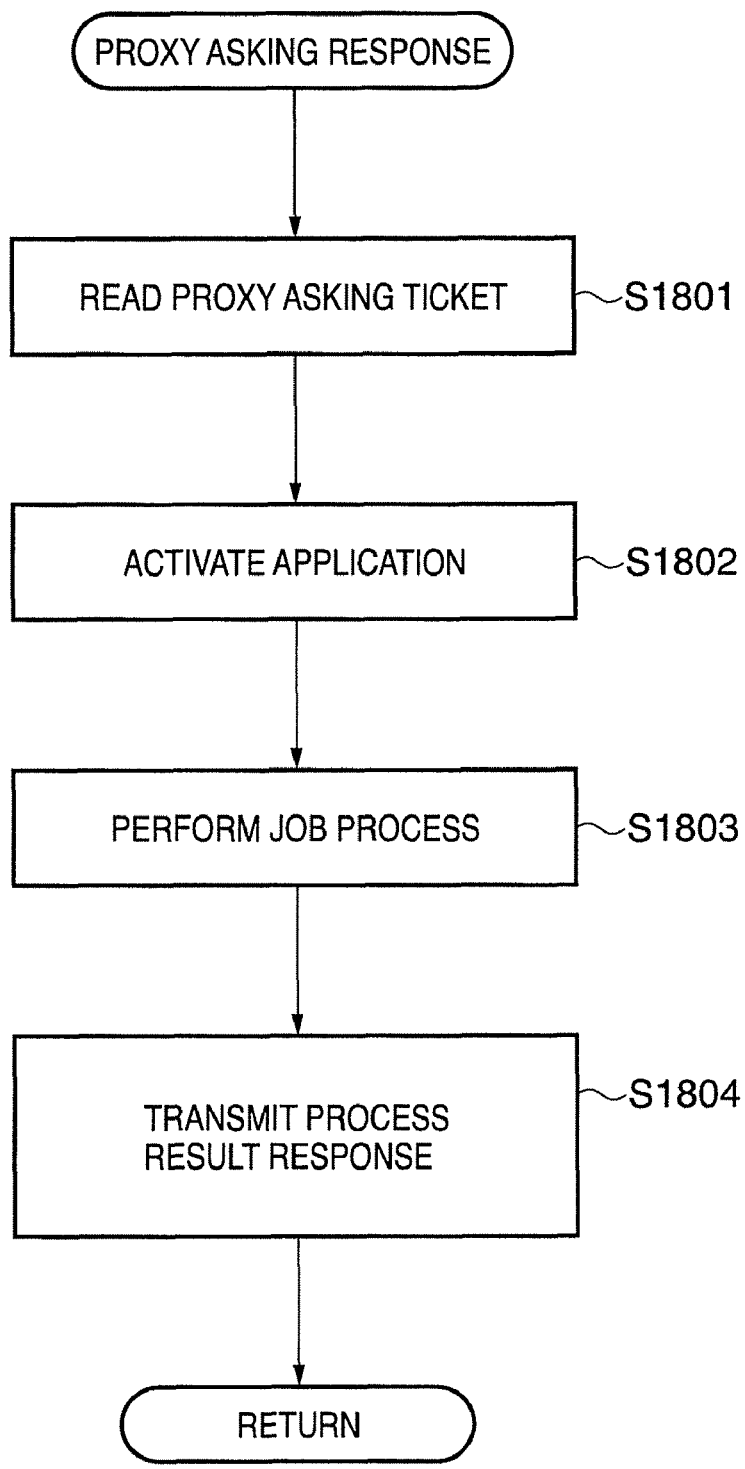
FIG. 18 is a flowchart showing the detailed sequence of a proxy asking response process.

FIG. 18 shows the detailed sequence of the proxy asking response process (step S1304) in device B. The proxy agent 505 and device application 504 perform this process. The following description also refers to the flowchart of FIG. 24 additionally showing the proxy asking process (step S805) in device A (reference numerals shown in FIG. 24 correspond to those shown in FIG. 18).

A proxy asking ticket is read (step S1801) to activate a device application 504 represented by a process component stored in the ticket (step S1802). A job is processed in accordance with the input information 2804 and output information 2805 stored in the ticket (step S1803). The process result is added to a proxy process result message to transmit the proxy process result message to device A (step S1804).

5.5 Sequence of License Return Response Process

Figure 19:
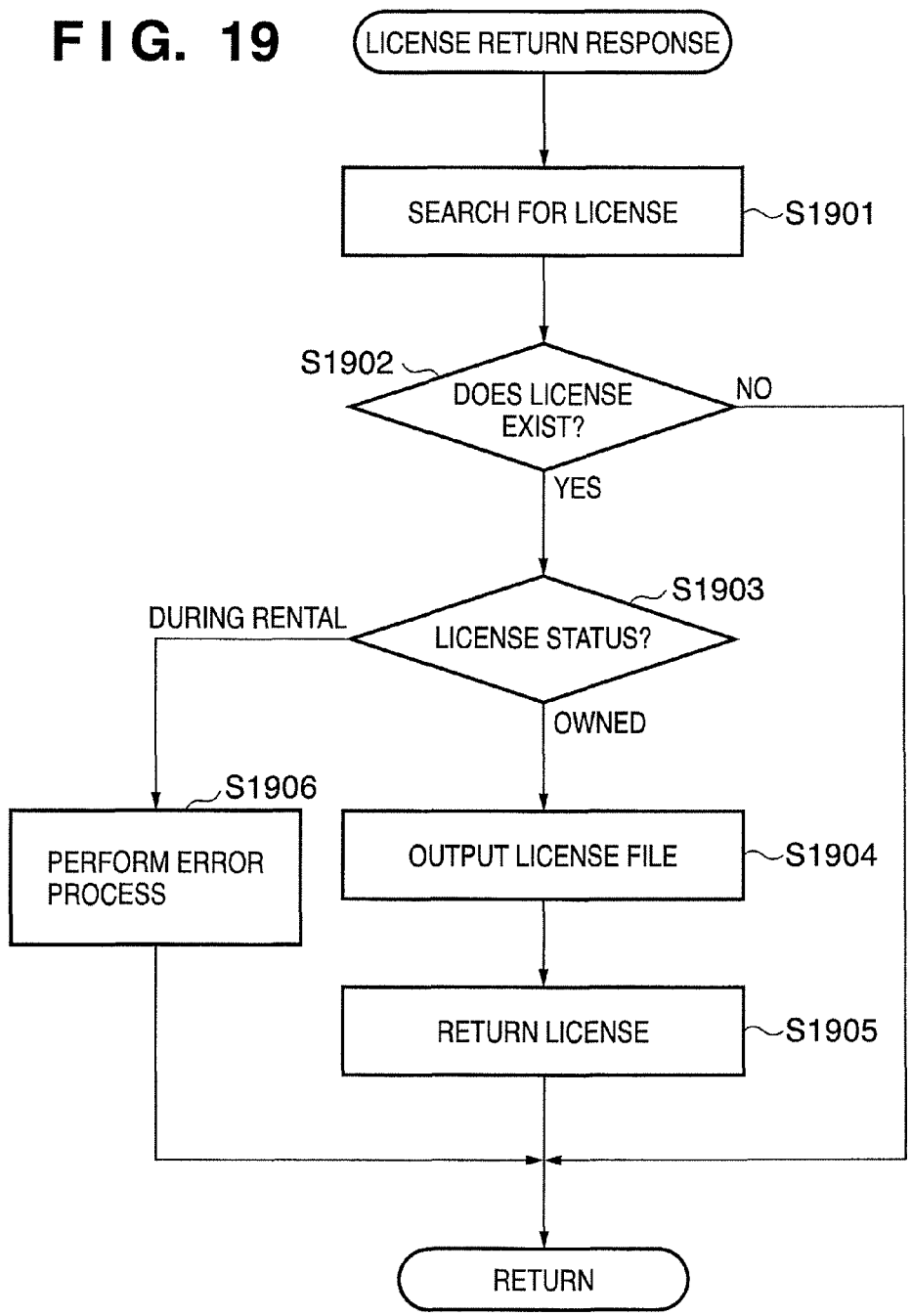
FIG. 19 is a flowchart showing the detailed sequence of a license return response process.

The license return response process (step S1305) will be explained. FIG. 19 is a flowchart showing the detailed sequence of the license return response process (step S1305) in device B. The license management unit 506 performs this process. The following description also refers to the flowchart of FIG. 25 additionally showing the license return request process (step S807) in device A (reference numerals shown in FIG. 25 correspond to those shown in FIG. 19).

The license management unit 506 searches the license DB 507 for a license of a license ID transmitted together with a license return request message (step S1901), and determines whether a license of the license ID has been detected (step S1902). The license may be expired, or its valid count may be 0.

If no license of the license ID is detected, the license management unit 506 escapes from the process. If a license of the license ID is detected, the license management unit 506 determines whether the license is during rental (step S1903). If the license management unit 506 determines that the license is owned, it outputs the license to a file (step S1904), adds the license to a license request return message, and transmits the message to device A (step S1905).

In the embodiment, the license management unit 506 inhibits rental (sublet) of a rented license in order to avoid license management from being complicated. Thus, it is not determined generally in step S1903 that the license is during rental. If it is determined that the license is during rental, the license DB 507 is highly likely to be abnormal, so the license management unit 506 performs the error process (step S1906) and escapes from the process. It is also possible to permit sublet of a license and recursively execute the license return request process instead of step S1906.

As is apparent from the above description, the embodiment can execute the proxy process even when no device application (component) is installed or the device does not have any license. This obviates the need to register an alternative device in advance. Even when the capability temporarily degrades due to a heavy load on the device, a trouble, or the like, or the system configuration changes, an optimum alternative device can automatically execute a proxy process without changing any setting.

After the proxy process, the rented license of a device application is returned to an original device, which then can utilize the device application again. If the proxy process occurs frequently, the return timing is set after the request. This can decrease the license rental frequency, reduce the network traffic and file input/output, and increase the process efficiency.

Second Embodiment

In the first embodiment, a rented license is returned immediately after an alternative device ends a proxy process. However, this is not efficient when the proxy process is often asked. To prevent this, the second embodiment can designate the return timing of a rented license as an alternative device condition.

In FIG. 29, reference numeral 2900 denotes an example of a proxy search ticket capable of designating the license return timing. A license return timing 2901 takes one of "none/immediately/after request". When the license return timing 2901 is "none", no provided license need be returned after the process (license transfer). When the license return timing 2901 is "immediately", a license needs to be returned immediately after the process. According to the second embodiment, when the license return timing 2901 is "after request", a license is returned at an arbitrary timing after the end of the process.

To cope with the proxy search ticket 2900, the license DB according to the second embodiment is as shown in FIG. 30. A "return" column 3001 is added to the license DB. When device A rents a license, the "return" column 3001 records the "license return" value of a proxy search ticket as an alternative device condition corresponding to "return" of the rented license.

Figure 31:
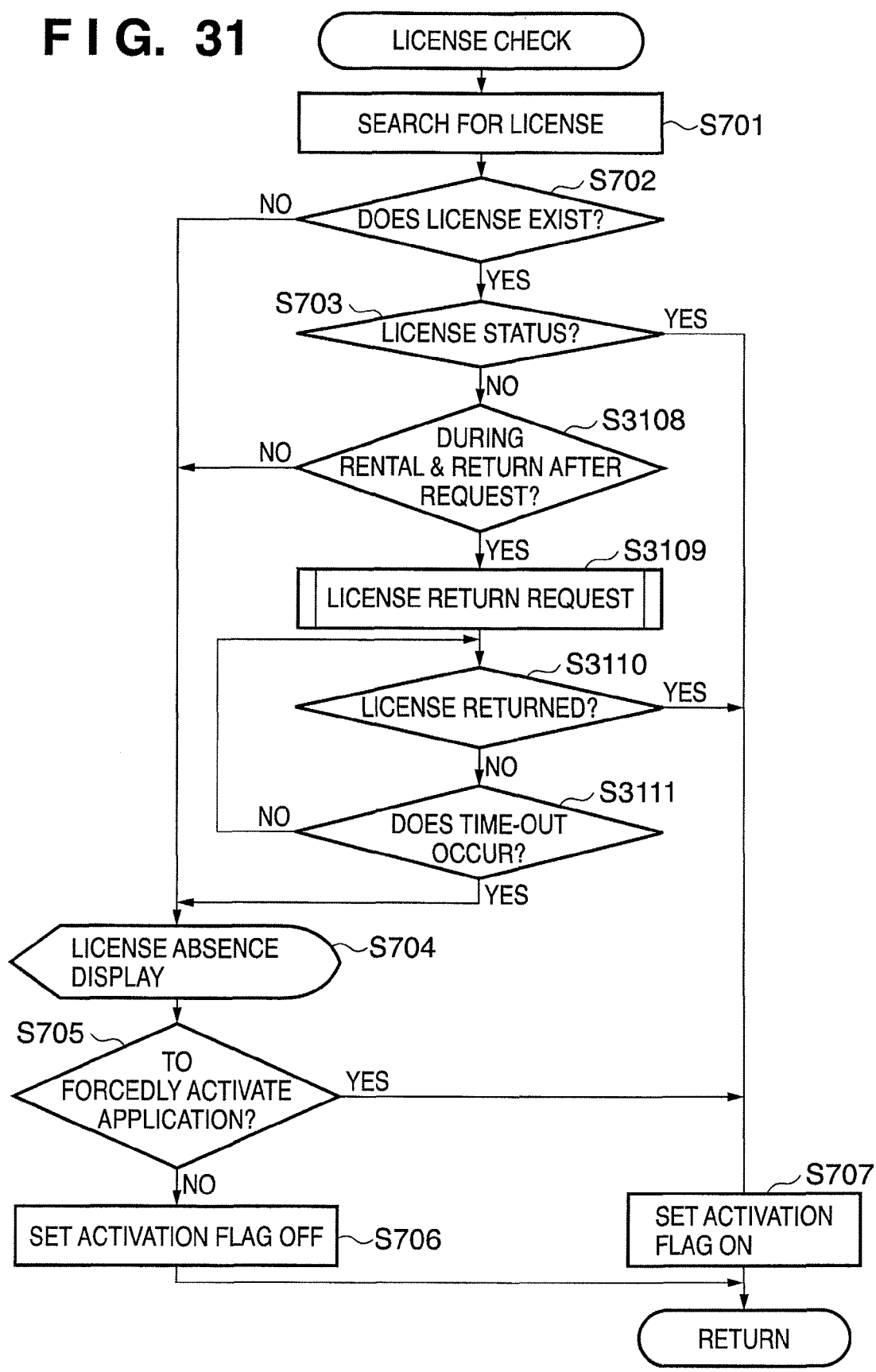
FIG. 31 is a flowchart showing the sequence of a license check process corresponding to the proxy search ticket capable of designating the license return timing.

In this case, steps S3108 to S3111 are added to the license check process (step S602), as shown in FIG. 31. Processes with the same reference numerals as those in FIG. 7 are the same as those in FIG. 7. Details of the added processes will be explained.

After step S703, it is determined whether a license is during rental and the return timing is "after request" (step S3108).

If no license is during rental or the return timing is not "after request", the same process as that in a case in which no license is detected is performed (steps S704 to S707). If it is determined in step S3108 that the license is during rental and the return timing is "after request", the license return request process is performed (step S3109).

In step S3110, it is determined whether the license has been returned in step S3109. If it is determined that no license has been returned, the process advances to step S707 to set the activation flag ON, and the sequence escapes from the process. If no license has been returned, the process advances to step S3111 to determine whether the preset time has elapsed (whether a time-out occurs). If it is determined that the preset time has not elapsed, the process waits for return of the license till the time-out (steps S3110 and S3111). If it is determined that a time-out occurs, the same process as that in a case in which no license is detected in step S702 is performed (steps S704 to S707).

As is apparent from the above description, if the return timing is set to "after request" and a license is rented, the license can be returned when it actually becomes necessary, without returning the license immediately after the proxy process. This obviates the need to frequently rent a license, reduces the network traffic and file input/output, and efficiently rents a license.

Other Embodiment

The present invention may be applied to a system including a plurality of devices (e.g., a host computer, interface device, reader, and printer) or an apparatus (e.g., a copying machine or facsimile apparatus) formed by a single device.

The object of the present invention is also achieved by supplying a storage medium which records software program codes for implementing the functions of the above-described embodiments to a system or apparatus. In this case, these functions are achieved by reading out and executing the program codes stored in the storage medium by the computer (or the CPU or MPU) of the system or apparatus. In this case, the storage medium which stores the program codes constitutes the present invention.

The storage medium for supplying the program codes includes a floppy® disk, hard disk, optical disk, magnetooptical disk, CD-ROM, CD-R, magnetic tape, nonvolatile memory card, and ROM.

The present invention is not limited to a case in which the functions of the above-described embodiments are implemented when the computer executes the readout program codes. Also, the present invention includes a case in which an OS (Operating System) or the like running on the computer performs some or all of actual processes on the basis of the instructions of the program codes and thereby implements the functions of the above-described embodiments.

Furthermore, the present invention includes a case in which the functions of the above-described embodiments are implemented after the program codes read out from the storage medium are written in the memory of a function expansion board inserted into the computer or the memory of a function expansion unit connected to the computer. That is, the present invention also includes a case in which after the program codes are written in the memory, the CPU of the function expansion board or function expansion unit performs some or all of actual processes on the basis of the instructions of the program codes and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-095843, filed on Mar. 30, 2006, which is hereby incorporated by reference herein in its entirety.

What is claimed is:

1. An information processing apparatus which communicates with a plurality of external apparatuses that execute a process of a job by using a program which is executed if a license is provided, comprising:
    an executing unit constructed to execute a process of a job;
    a determination unit constructed to determine whether or not the executing unit can execute the process of the job;
    a decision unit constructed to decide an alternative device to make the process of the job alternate among the plurality of external apparatuses if the determination unit determines that the executing unit cannot execute the process of the job; and
    a transmission unit responsive to a determination by the determination unit that the executing unit cannot execute the process of the job, wherein responsive to such determination the transmission unit transmits condition information indicating a condition necessary for the alternative device to alternate the process of the job to the plurality of external apparatuses, wherein the alternative device is decided based at least on the condition information,
    wherein the decision unit determines whether or not there are external apparatuses among the plurality of external apparatuses which do not need the license to be provided from the information processing apparatus for executing the process of the job, wherein the external apparatuses are for executing the process of the job for the information processing apparatus, and wherein if the decision unit determines that external apparatuses which do not need the license are among the plurality of external apparatuses, the decision unit decides the alternative device from among the external apparatuses which do not need the license based on information responded from the external apparatuses depending on the transmission by the transmission unit and outputs the job to the alternative device, and if the decision unit determines that external apparatuses which do not need the license are not among the plurality of external apparatuses, the decision unit decides the alternative device from among the plurality of external apparatuses based on information responded from the external apparatuses depending on the transmission by the transmission unit and outputs the job and the license to the alternative device.

2. The information processing apparatus according to claim 1, wherein the condition information indicating the condition necessary for the alternative device to alternate the process of the job includes information used to determine whether or not the external apparatuses need the license to be provided from the information processing apparatus, and the decision unit determines whether or not the external apparatuses are among the plurality of external apparatuses, which do not need the license, based on the result of determining whether or not the external apparatuses need the license by using the information.

3. The information processing apparatus according to claim 1, wherein if the alternative device failed to execute the process of the job, the executing unit executes the process of the job.

4. The information processing apparatus according to claim 1, further comprising a request unit constructed to request the alternative device to return the license if the license has been output to the alternative device.

5. The information processing apparatus according to claim 4, further comprising a designation unit constructed to designate the license return timing.

6. The information processing apparatus according to claim 1, wherein the determination unit determines that the executing unit cannot execute the process of the job when the information processing apparatus is in at least one of a state in which a load on the information processing apparatus is larger than a specific value, a state in which the information processing apparatus does not incorporate a program used for the process of the job, a state in which an error occurs in the information processing apparatus, or a state in which an error occurs for another job in the information processing apparatus.

7. An information processing apparatus which communicates with an external apparatus that asks to execute a proxy process of a job, and which executes the proxy process of the job by using a program which is executed if a license is provided, comprising:
    a determination unit constructed to determine, if the proxy process of the job is asked from the external apparatus, whether or not the license necessary for the program used for the proxy process of the job is held;

a receiving unit constructed to determine, if the determination unit determines that the license is not held, the license necessary for the program from the external apparatus;

a proxy processing unit constructed to perform proxy processing of the job by executing the program by using the license received by the receiving unit;

a transmitting unit constructed to transmit information regarding a result of the proxy processing of the job by the proxy processing unit to the external apparatus; and a returning unit constructed to return, if the information regarding the result of the proxy processing of the job is transmitted by the transmitting unit and the license received by the receiving unit is requested to return, the license received by the receiving unit.

8. The information processing apparatus according to claim 7, wherein the information included in the license return request includes any information that indicates it is necessary to return the license, information that requests the return of the license immediately after the proxy processing of the job is executed, or information for requesting to return the license if a predetermined instruction is received from the external apparatus.

9. The information processing apparatus according to claim 8, wherein if the information included in the license return request includes the information indicating that it is not necessary to return the license, the returning unit does not return the license.

10. The information processing apparatus according to claim 8, wherein if the information included in the license return request includes the information that requests the return the of license immediately after the proxy processing of the job is executed, the returning unit returns the license immediately after the proxy processing of the job is executed.

11. The information processing apparatus according to claim 8, wherein if the information included in the license return request includes the information that requests the return of the license if a predetermined instruction is received from the external apparatus, the returning unit returns the license if the predetermined instruction is received from the external apparatus.

12. An information processing system comprising a plurality of external apparatuses which execute a process of a job by using a program which is executed if a license is provided, and an information processing apparatus which communicates with the plurality of external apparatuses, wherein the information processing apparatus comprises:

an executing unit constructed to execute a process of a job;

a determination unit constructed to determine whether or not the executing unit can execute the process of the job; and a decision unit constructed to decide an alternative device to make the process of the job alternate among the plurality of external apparatuses if the determination unit determines that the executing unit cannot execute the process of the job, wherein the decision unit determines whether or not there are external apparatuses among the plurality of external apparatuses which do not need the license to be provided from the information processing apparatus for executing the process of the job for the information processing apparatus, and wherein if the decision unit determines that external apparatuses which do not need the license are among the plurality of external apparatuses, the decision unit decides which alternative device from among the external apparatuses do not need the license and outputs the job to the alternative device, and if the decision unit determines that external apparatuses which do not need the license are not among the plurality of external apparatuses, the decision unit decides the alternative device from among the plurality of external apparatuses and outputs the job and the license to the alternative device, and wherein each of the plurality of the external apparatuses comprises:

a recognition unit constructed to determine, if the proxy process of the job is asked from the external apparatus, whether or not the license necessary for the program used for a proxy process of the job is held;

a receiving unit constructed to receive, if the recognition unit determines that the license is not held, the license necessary for the program from the external apparatus;

a proxy processing unit constructed to perform proxy processing of the job by executing the program by using the license received by the receiving unit;

a transmitting unit constructed to transmit information regarding a result of the proxy processing of the job by the proxy processing unit to the external apparatus; and a returning unit constructed to return, if the information regarding the result of the proxy processing of the job is transmitted by the transmitting unit and the license received by the receiving unit is requested to return, the license received by the receiving unit at a time which is specified by information included in the license return request.

13. A computer-readable storage medium which retrievably stores a program that causes a computer to perform as each unit of the information processing apparatus according to claim 1.

14. A computer-readable storage medium which retrievably stores a program that causes a computer to perform as each unit of the information processing apparatus according to claim 7.

* * * * *